United States Patent
Hsu et al.

(10) Patent No.: US 11,553,824 B2
(45) Date of Patent: Jan. 17, 2023

(54) AUTOMATIC GUIDING METHOD FOR SELF-PROPELLED APPARATUS

(71) Applicant: POWER LOGIC TECH. INC., New Taipei (TW)

(72) Inventors: Wen-Faung Hsu, New Taipei (TW); Chia-Heng Hsu, New Taipei (TW); Hung-Chou Chen, New Taipei (TW)

(73) Assignee: POWER LOGIC TECH, INC., New Taipei (TW)

(*) Notice: Subject to any disclaimer, the term of this patent is extended or adjusted under 35 U.S.C. 154(b) by 370 days.

(21) Appl. No.: 16/911,783

(22) Filed: Jun. 25, 2020

(65) Prior Publication Data

US 2021/0401252 A1    Dec. 30, 2021

(51) Int. Cl.
*G05D 1/02* (2020.01)
*A47L 9/28* (2006.01)
(Continued)

(52) U.S. Cl.
CPC .............. *A47L 9/2873* (2013.01); *A47L 9/009* (2013.01); *A47L 9/2852* (2013.01); *A47L 9/30* (2013.01);
(Continued)

(58) Field of Classification Search
CPC ...... A47L 9/2873; A47L 9/009; A47L 9/2852; A47L 9/30; A47L 2201/022;
(Continued)

(56) References Cited

U.S. PATENT DOCUMENTS 6,278,917 B1 * 8/2001 Bauer ............... G05D 1/0272
901/1
10,730,397 B2 * 8/2020 Romanov .......... A47L 11/4061
(Continued)

FOREIGN PATENT DOCUMENTS

JP    2007265412 A  * 10/2007  ........... A47G 1/0633
KR    101428846 B1  *  3/2012  ............... G05D 1/12
(Continued)

OTHER PUBLICATIONS

Office Action dated Apr. 29, 2021 of the corresponding Taiwan patent application No. 109110806.

*Primary Examiner* — B M M Hannan
(74) *Attorney, Agent, or Firm* — Chun-Ming Shih; HDLS IPR Services

(57) ABSTRACT

An automatic guiding method for a self-propelled apparatus (10) is provided. The self-propelled apparatus (10) turns and irradiates when a signal light emitted by a charging dock (20) is sensed by a flank sensor (103), and changes its turn direction when another different signal light from the charging dock (20) is sensed by a forward sensor (102). The charging dock (20) switches to emit another signal light different from the signal light currently emitted when each time is triggered by the signal light emitted by the self-propelled apparatus (10). Repeatedly execute the above actions and make the self-propelled apparatus approach the light-emitting unit (202) until the self-propelled apparatus (10) reaches a charging position. It can accurately guide the self-propelled apparatus (10) to the charging position by arranging only two sensors on the self-propelled apparatus.

15 Claims, 21 Drawing Sheets

(51) Int. Cl.
  *A47L 9/00* (2006.01)
  *A47L 9/30* (2006.01)
  *B25J 9/16* (2006.01)
  *B25J 13/08* (2006.01)
  *B25J 9/00* (2006.01)

(52) U.S. Cl.
  CPC ........... B25J 9/1664 (2013.01); B25J 13/086 (2013.01); G05D 1/0225 (2013.01); G05D 1/0234 (2013.01); *A47L 2201/022* (2013.01); *A47L 2201/04* (2013.01); *B25J 9/0003* (2013.01)

(58) Field of Classification Search
  CPC ... A47L 2201/04; B25J 9/1664; B25J 13/086; B25J 9/0003; G05D 1/0225; G05D 1/0234; G05D 2201/0203
  USPC .......................................................... 701/23
  See application file for complete search history.

(56) References Cited

U.S. PATENT DOCUMENTS

| | | | |
|---|---|---|---|
| 2013/0098401 A1* | 4/2013 | Yoon | A47L 11/4055 15/21.1 |
| 2015/0105904 A1* | 4/2015 | Mou | A01D 34/008 901/1 |
| 2017/0273531 A1* | 9/2017 | Watanabe | A47L 9/0411 |
| 2018/0296049 A1* | 10/2018 | Izawa | G05D 1/0246 |
| 2019/0231160 A1* | 8/2019 | Lu | A47L 9/2873 |
| 2019/0243373 A1* | 8/2019 | Kuo | H02J 7/0042 |
| 2020/0305670 A1* | 10/2020 | Kim | A47L 9/2884 |
| 2021/0023705 A1* | 1/2021 | Chae | G05D 1/0257 |
| 2022/0142438 A1* | 5/2022 | Chen | G01S 17/93 |

FOREIGN PATENT DOCUMENTS

| | | | | |
|---|---|---|---|---|
| KR | 20150050161 A | * | 5/2015 | ............ H02J 7/0042 |
| KR | 20170028237 A | * | 3/2017 | ............. D06F 39/00 |
| KR | 20170132017 A | * | 12/2017 | ........ H04M 1/72415 |
| TW | 201947893 A | | 12/2019 | |

* cited by examiner

AUTOMATIC GUIDING METHOD FOR SELF-PROPELLED APPARATUS

BACKGROUND OF THE INVENTION

Field of the Invention

The technical field relates to self-propelled apparatuses, and more particularly related to an automatic guiding method for the self-propelled apparatuses.

Description of Related Art

Currently, many self-propelled apparatuses with the ability to clean automatically (such as the sweeping robots) have been provided. The self-propelled apparatuses of the related art may execute an automatic return command to go back to the charging dock automatically for charging when the battery is low.

In addition, an automatic return technology based on indoor positioning has been provided. The automatic return technology is to control the self-propelled apparatus to go back to the position of the charging dock by using indoor positioning technique when the battery is low. The above-mentioned technology must locate both the charging dock and the self-propelled apparatus, so it is necessary to install the additional indoor positioning device (such as a Bluetooth transceiver) or the trajectory-recording program.

Furthermore, an automatic return technology based on heterogeneous sensors is also provided. The automatic return technology is to install various types of sensors (such as ultrasonic sensor, infrared sensor, wireless network transceiver, etc.) on each side of the self-propelled apparatus. The various types of sensors guide the self-propelled apparatus to go back to the charging dock. For example, the ultrasonic sensors are used for long-distance guidance, the infrared sensors are used for short-distance guidance, the wireless network transceivers are used to confirm the position of charging dock and so forth. The above-mentioned technology requires the installation of various types of sensors on the self-propelled apparatus, and significantly increases its cost. Additionally, the above-mentioned technology uses the various types of sensors that make the guidance procedure become very complex.

As the automatic return technologies of the related art have the above-mentioned problems, there is a need for a more effective solution.

SUMMARY OF THE INVENTION

The present disclosed example is direct to an automatic guiding method for self-propelled apparatuses with the ability to simplify the number of sensors and improve the guiding complexity.

In one of the exemplary embodiments, an automatic guiding method used to guide a self-propelled apparatus to move to a charging position of a charging dock comprises following steps:

a) controlling the self-propelled apparatus to turn in a first turn direction and move within an irradiation range of the light-emitting unit of the charging dock when sensing a signal light embedding a first signal emitted by a light-emitting unit installed at a position corresponding to the charging position of the charging dock by a flank sensor installed on at least one of left-half flank or right-half flank of the self-propelled apparatus, and controlling a light-emitter of the self-propelled apparatus installed on the front side of the self-propelled apparatus to irradiate during turn and motion; b) controlling the light-emitting unit to switch to emit a signal light embedding a second signal when the charging dock emits the signal light embedding the first signal and a sensing unit installed beside the light-emitting unit of the charging dock is triggered by irradiation of the light emitter of the self-propelled apparatus; c) controlling the self-propelled apparatus to turn in a second turn direction opposite to the first turn direction when a front sensor installed on the front side of the self-propelled apparatus senses the signal light embedding the second signal, and controlling the light emitter to irradiate during turning; d) controlling the light-emitting unit to switch to emit the signal light embedding the first signal when the charging dock emits the signal light embedding the second signal and the sensing unit is triggered by irradiation of the light emitter of the self-propelled apparatus; e) controlling the self-propelled apparatus to turn in the first turn direction when the front sensor of the self-propelled apparatus senses the signal light embedding the first signal, and controlling the light emitter to irradiate during turn; and f) repeatedly executing the steps b) to e) and simultaneously controlling the self-propelled apparatus to approach the light-emitting unit until the self-propelled apparatus reaches a charging position and starts to be charged by the charging dock.

The present disclosed example can accurately guide the self-propelled apparatus to the charging position by arranging only two sensors on the self-propelled apparatus.

BRIEF DESCRIPTION OF DRAWINGS

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
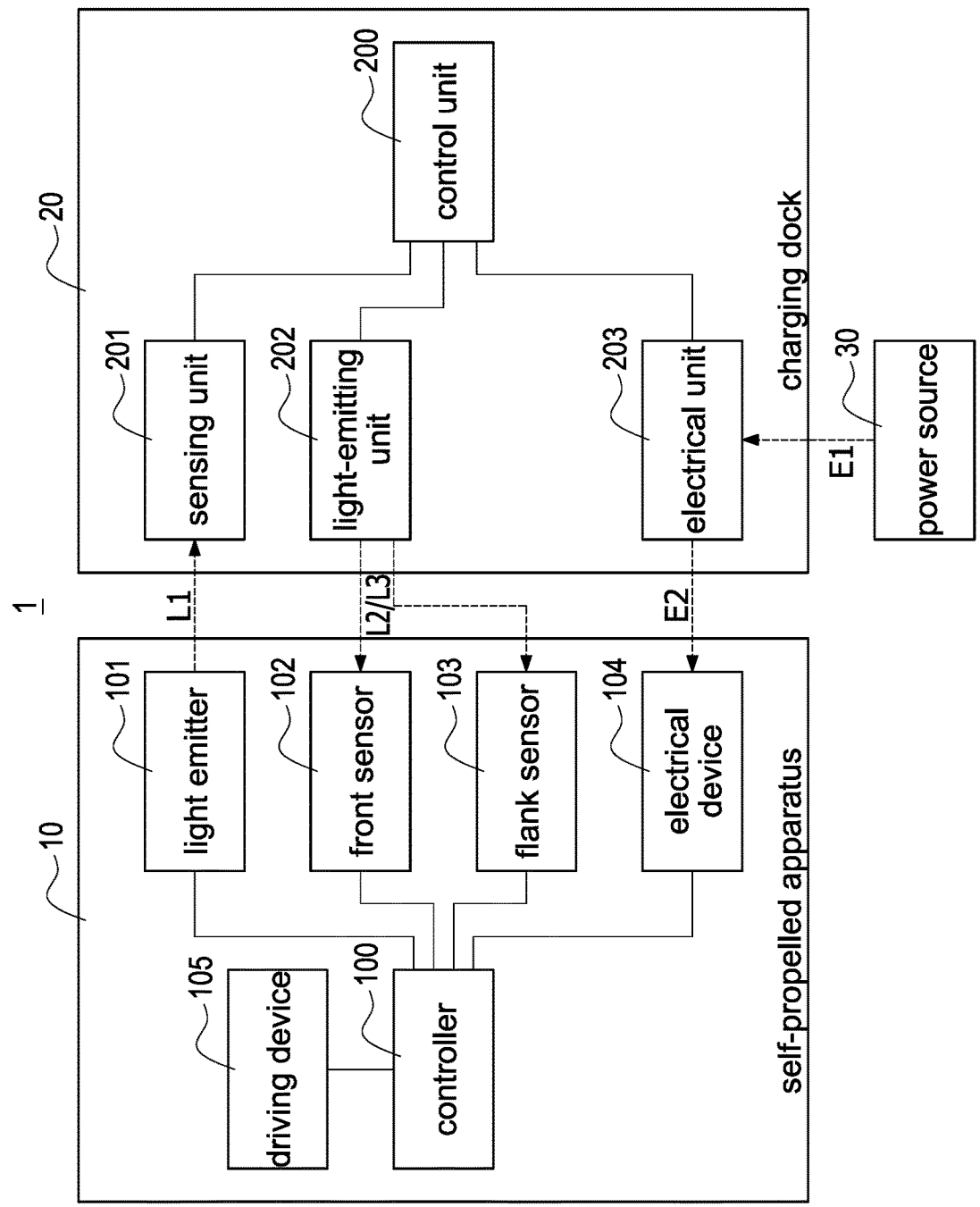
FIG. 1 is the architecture diagram of the system according to the first implement aspect of the present disclosed example.

Please refer to FIG. 1. FIG. 1 is the architecture diagram of the system according to the first implement aspect of the present disclosed example. The present disclosed example mainly discloses a system 1 with the ability to guide the self-propelled apparatus to move the charging position of the charging dock by using the most simplified sensors and procedure.

More specifically, the system 1 comprises a self-propelled apparatus 10 and a charging dock 20. The self-propelled apparatus 10 may comprise the light emitter 101, the front sensor 102, the flank sensor 103, the electrical device 104, the driving device 105 and the controller 100 electrically connected to the above devices.

The light emitter 101 is installed on the front side of the self-propelled apparatus 10, and is used to emit the signal light L1 toward the front. The front sensor 102 is installed on the front side of the self-propelled apparatus 10, and is used to sense the signal light in the front. The flank sensor 103 is installed on the left-half flank or the right-half flank of the self-propelled apparatus 10, and is used to sense the signal light in the left-half flank or the right-half flank.

The electrical device 104 is used to receive the electricity, and stores the electricity to provide to the self-propelled apparatus for operation. More specifically, when the self-propelled apparatus 10 arrives at the charging position and couples with the electrical unit 203 of the charging dock 20, the electrical device 104 may receive the electricity E2 from the electrical unit 203.

The driving device 105 may comprise a motor, drive wheels and other transmission parts, and is used to drive the self-propelled apparatus 10 to move. The controller 100 is used to control each device of the self-propelled apparatus 10 to operate.

The charging dock 20 used to conduct the self-propelled apparatus 10 to stir for arrival at the charging position. The charging dock 20 may comprise the sensing unit 201, the light-emitting unit 202, the electrical unit 203 and the control unit 200 electrically connected to the above devices. Moreover, the sensing unit 201 is arranged at a position near the light-emitting unit 202. For example, the sensing unit 201 is arranged at the position beside the light-emitting unit 202.

The sensing unit 201 is used to detect the signal light, and is configured to be triggered when detecting the irradiation of the light emitter 101 of the self-propelled apparatus 10.

The light-emitting unit 202 is arranged at a position corresponding to the above-mentioned charging position and is used to emit the signal light. More specifically, a relationship between the arranged position (installed position) of the light-emitting unit 202 and the charging position is pre-stored in the self-propelled apparatus 10, and the self-propelled apparatus 10 moves to the charging position based on the above relationship by tracing the arranged position of the light-emitting unit 202. Moreover, the light-emitting unit 202 may emit the signal light embedding the first signal and the signal light embedding the second signal alternately by switching. Thus, the charging dock 20 can guide the self-propelled apparatus 10 to arrive at the charging position by switching the different signal lights.

The electrical unit 203 is used to provide the electricity to the charging dock 20 for operation, and may provide the electricity E2 to the external device. The control unit 200 is used to control the operations of each of the devices of the charging dock 20.

Figure 2:
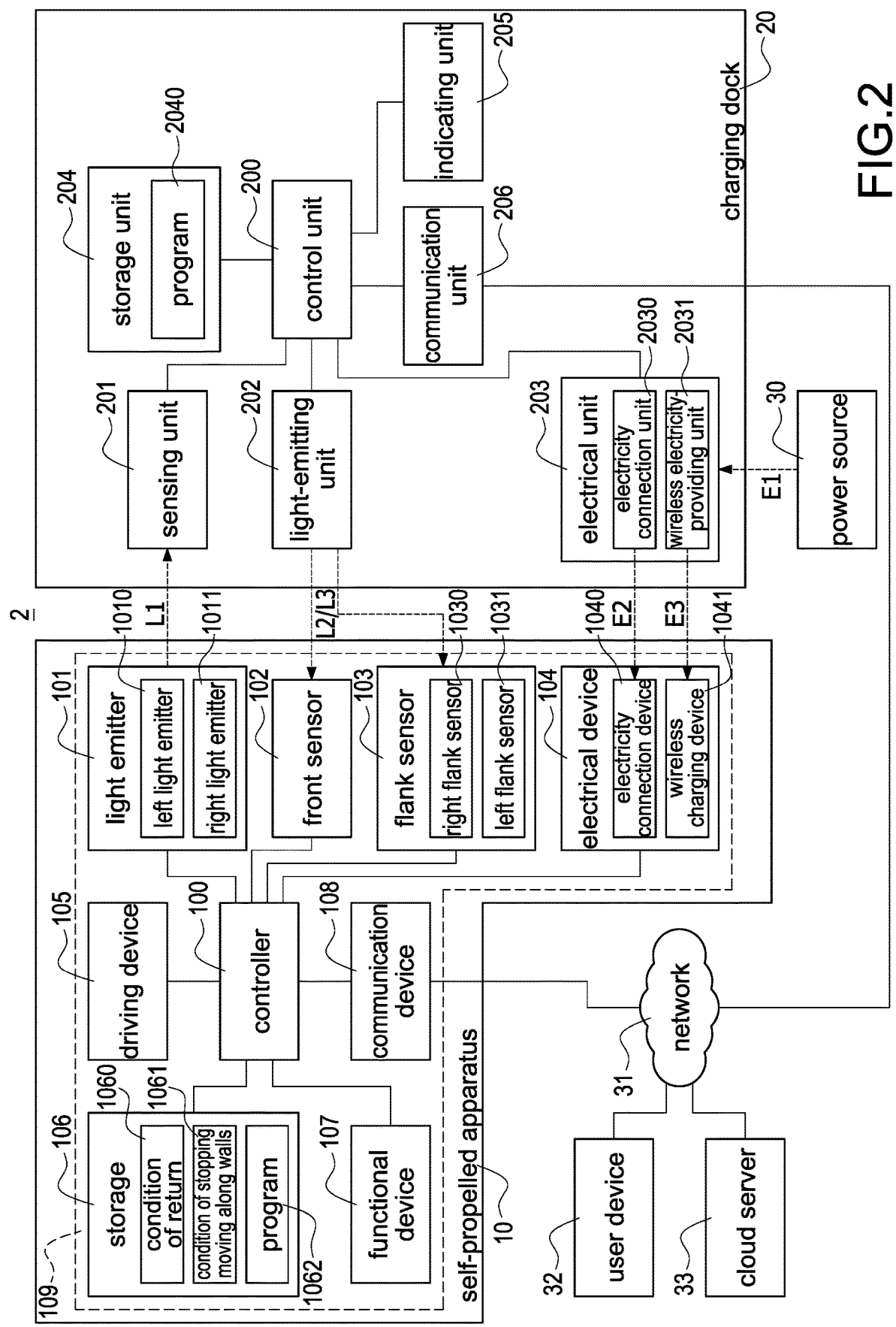
FIG. 2 is the architecture diagram of the system according to the second implement aspect of the present disclosed example.

Please refer to FIG. 2 simultaneously. FIG. 2 is the architecture diagram of the system according to the second implement aspect of the present disclosed example. The system 2 of the implement aspect is similar to the system 1 described above, but the difference between system 2 and system 1 will be described in the following description.

The self-propelled apparatus 10 may further comprise the storage 106 electrically connected to the control 100, the functional device 107 and the communication device 108.

The storage 106 is used to store the data. The functional device 107 is used to implement the designated function, such as air purification function, dehumidification function, heater function and/or vacuum cleaning function. As one of the implementation aspects, the functional device 107 may be controlled to operate when the self-propelled apparatus 10 is moving or has arrived at the designated position.

The communication device 108, such as NFC module, Bluetooth module, Wi-Fi module, cellular network module, Zigbee module, Ethernet module, infrared transceiver or any combination of the above communication devices, is used to communicate with the external device.

As one of the implementation aspects, the communication device 108, may be connected to the network 31, and connect to the user device 32 and/or the cloud server 33 for receiving the command or update data from the user device 32 and/or the cloud server 33.

As one of the implementation aspects, the user may operate the used device 32, such as the remote controller or the networking mobile device installed the designated application program, to generate and send an operation command to the communication device 108. The controller 100 controls the self-propelled apparatus 10 based on the received operation command, such as moving to a designated position, adjusting the operational parameters, returning for charging, turning off the power and so forth.

As one of the implementation aspects, the self-propelled apparatus 10 may comprise a case 109. The case 109 may partially or completely cover one or more devices of the self-propelled apparatus 10 for protection.

Figure 17:
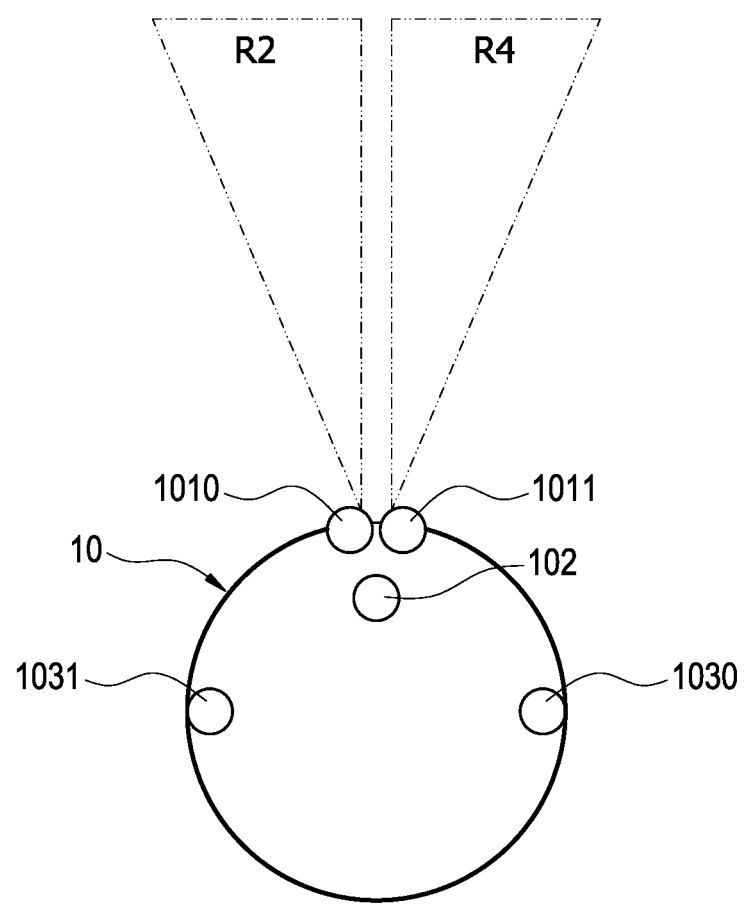
FIG. 17 is the schematic view of the self-propelled apparatus according to the fifth example of the present disclosed example.

Please refer to FIG. 2 and FIG. 17 simultaneously. FIG. 17 is the schematic view of the self-propelled apparatus according to the fifth example of the present disclosed example. As one of the implementation aspects, the light emitter 101 may comprise the right light emitter 1010 and the right light emitter 1011. Moreover, the flank sensor 103 may comprise the right flank sensor 1030 and the left flank sensor 1031.

As one of the implementation aspects, the above-mentioned light emitter is the infrared emitter, the above-mentioned sensor is the infrared receiver, and the above-mentioned signal light is the infrared signal light.

In the present disclosed example, one of the combinations that the combination of the front sensor 102, the left light emitter 1010 and the right flank sensor 1030 and the combination of the front sensor 102, the right light emitter 1011 and the left flank sensor 1031 could be used to implement the automatic guide.

On the other hand, with the execution of automatic guide, just one of the above combinations will be enabled. The present disclosed example can make the self-propelled apparatus 10 achieve the return function by arranging only two sensors and one light emitter.

In the present disclosed example, the left light emitter 1010 is configured to be enabled to irradiate toward the front left-half flank (the irradiation range R2) of the self-propelled apparatus 10 and not irradiate toward the front right-half flank of the self-propelled apparatus 10 when the right flank sensor 1030 is triggered.

Moreover, the right light emitter 1011 is configured to be enabled to irradiate toward the front right-half flank (the irradiation range R4) of the self-propelled apparatus 10 and not irradiate toward the front left-half flank of the self-propelled apparatus 10 when the left flank sensor 1011 is triggered. The above-mentioned arrangement can prevent the irradiation ranges of the left light emitter 1010 and the right light emitter 1011 from overlapping, and prevent misjudgment.

As one of the implementation aspects, the right flank sensor 1030 may be installed on the rear right flank or the rightmost flank of the case 109 (FIG. 17 takes being arranged on the rightmost flank for example), and configured to sense toward the rear right flank or the rightmost flank of the self-propelled apparatus 10. Moreover, the left flank sensor 1031 may be installed on the rear left flank or the leftmost flank of the case 109 (FIG. 17 takes being arranged on the leftmost flank for example), and configured to sense toward the rear left flank or the leftmost flank of the self-propelled apparatus 10. The above-mentioned arrangement can prevent the sensing ranges of the flank sensor 103 and the front sensor 102 from overlapping, and prevent misjudgment.

Figure 20:
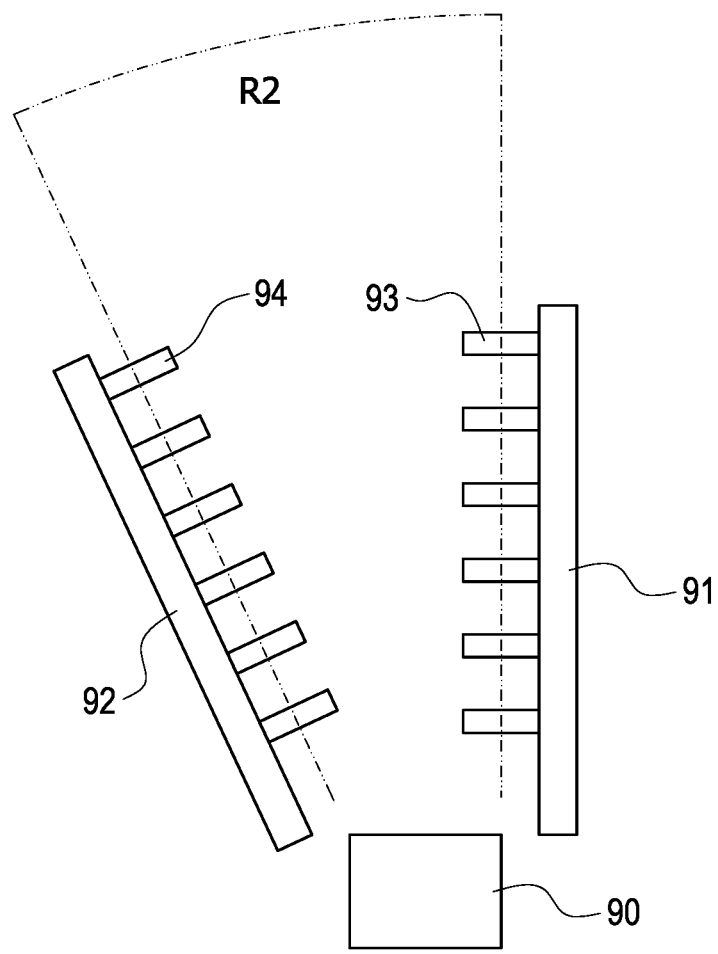
FIG. 20 is the schematic view of the light emitter according to the ninth example of the present disclosed example.

Please refer to FIG. 20. FIG. 20 is the schematic view of the light emitter according to the ninth example of the present disclosed example. The present disclosed example further discloses a lamp-holder structure with the ability to make the light precisely irradiate toward either the front left-half flank (the irradiation range R2) or the front right-half flank (the irradiation range R4) of the self-propelled apparatus 10 without irradiating to another one.

Although FIG. 20 takes the left light emitter 1010 for example, a person skilled in the art of the present disclosed example can understand based on the above disclosure that the lamp-holder structure disclosed above can also be used for the right light emitter 1011.

More specifically, light source 90 and reflection walls are arranged inside of the lamp-holder of the left light emitter 1010. The angle of the irradiation range R2 can be changed by adjusting the angle between left reflection wall 92 and the right reflection wall 91.

Moreover, the multiple layers of light-filtering slices 94 covering(blanking) a part of the light path are arranged on the left reflection wall 92, and the multiple layers of light-filtering slices 93 covering(blanking) the other part of the light path are arranged on the right reflection wall 93. By the arrangement of the above-mentioned multiple layers of light-filtering slices 93-94, the present disclosed example can slow down (restrain) the spread of light, enhance the straightness of light and accurately control the irradiation range R2.

Please refer to FIG. 2, one of the implementation aspects wherein the electrical device 104 of the self-propelled apparatus 10 uses wired charging. More specifically, the electrical device 104 may comprise the electricity connection device 1040, such as electrical connector or electrical port. The electrical unit 203 of the charging dock 20 may comprise electricity connection unit 2030, such as electrical connector or electrical port. The charging position may be the position enabling the electricity connection unit 2030 to couple to the electricity connection device 1040. Thus, when the self-propelled apparatus 10 arrives at the charging position, the electricity connection unit 2030 may provide the electricity E2 by a wired way to the electricity connection device 1040 for charging up the battery (not shown in figures) of the electrical device 104.

In one of the implementation aspects, the electrical device 104 of the self-propelled apparatus 10 uses wireless charging. More specifically, the electrical device may comprise wireless charging device 1041, the electrical unit 203 of the charging dock 20 comprises the wireless electricity-providing unit 2031. The charging position may be the position enabling the inductance coil of the wireless charging device 1041 to induce the inductance coil of the wireless electricity-providing unit 2031. Thus, when the self-propelled apparatus 10 arrives at the charging position, the wireless electricity-providing unit 2031 may provide the electricity E3 to the wireless charging device 1041 for charging up the battery of the electrical device 104.

The charging dock 20 may further comprise the storage unit 204, the indicating unit 205 and the communication unit 206 electrically connected to the control unit 200.

The storage unit 204 is used to store data. The communication unit 205 is similar to the communication device 108, and is used to communicate with the external device. In one of the implementation aspects, the communication unit 205 may be connected to the network 31, and communicate with the external device by the network 31, such as through the reception of command and update data.

The indicating unit 205, containing indicators, buttons, touchpad, display, speaker, buzzer, or any combination of the above devices, is used to interact with the user or output information.

In one of the implementation aspects, the electrical unit 203 is connected to the external power source 30, retrieves the electricity E1 from the power source 30, transfers the electricity E1 into electricity E2 or E3, and outputs the transferred electricity to the electrical device 104 of the self-propelled apparatus 10.

Figure 3:
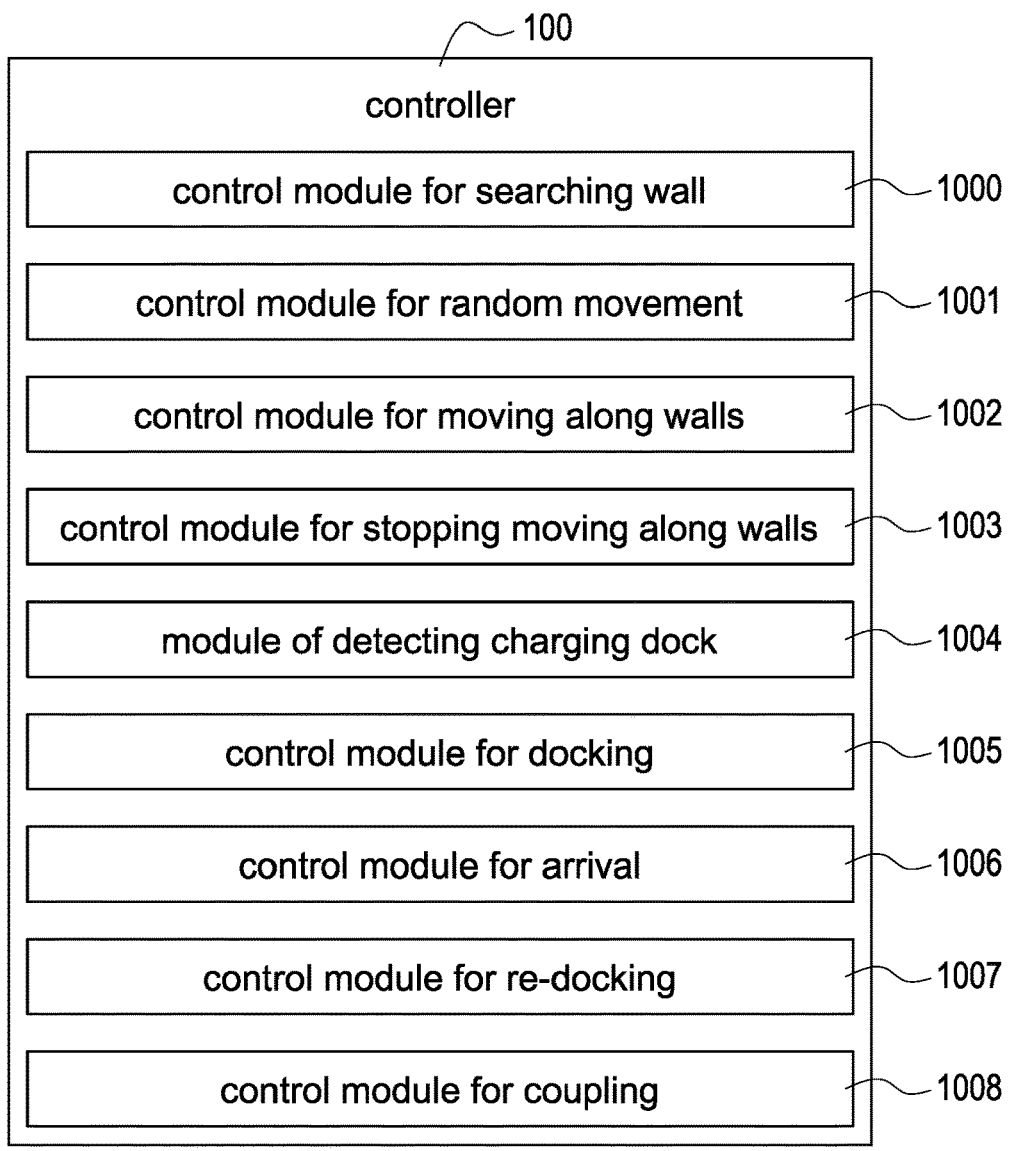
FIG. 3 is the architecture diagram of the controller according to the third implement aspect of the present disclosed example.
Figure 4:
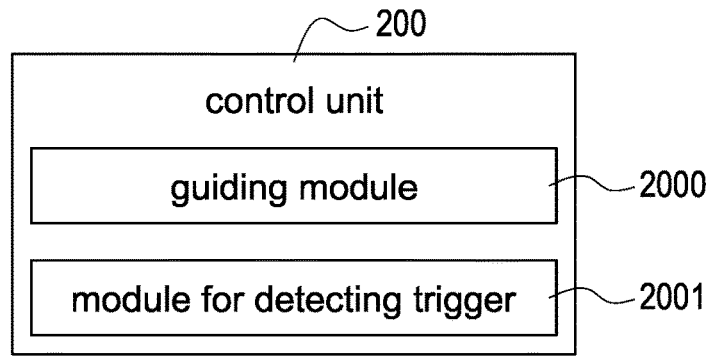
FIG. 4 is the architecture diagram of the control unit according to the fourth implement aspect of the present disclosed example.

Please refer to FIG. 3 and FIG. 4 simultaneously. FIG. 3 is the architecture diagram of the controller according to the third implement aspect of the present disclosed example, and FIG. 4 is the architecture diagram of the control unit according to the fourth implement aspect of the present disclosed example. In the present disclosed example, the controller 100 of the self-propelled apparatus 10 may comprise the following modules for implementing the different functions.

1. The control module for searching wall 1000, is configured to switch to the return mode when the condition of return (could be stored in the storage 106 in advance) is met. In the return mode, the controller 100 controls the driving device 105 to drive the self-propelled apparatus 10 to move along the wall when any wall is detected(sensed) by the front sensor 102 or the flank sensor 103.

2. The control module for random movement 1001, is configured to the driving device 105 to drive the self-propelled apparatus 10 to move randomly.

3. The control module for moving along walls 1002, is configured to control the driving module 105 to drive the self-propelled apparatus 10 to move along the wall. In one of the implementation aspects, the control module for moving along walls 1002 is configured to sense toward the wall, so as to detect the position of the wall and move along the detected wall.

As one of the implementation aspects, the control module for searching wall 1000 may be configured to firstly trigger the control module for random movement 1002 for making the self-propelled apparatus 10 to move randomly, and trigger the control module for moving along walls to make the self-propelled apparatus 10 start to move along the sensed wall when the wall is sensed by the front sensor 102 or the flank sensor 103 during random movement.

4. The stop control module along the wall 1003, is configured to control the driving device 105 to move away from the wall which the self-propelled apparatus 10 currently moves around when following conditions are met: the condition of stopping moving along walls (could be stored in the storage 106 in advance) being met during the driving device 105 driving the self-propelled apparatus 10 to move along the wall; and the front sensor 102 or the flank sensor 103 still senses none of signal light of the charging dock 20. And then the stop control module along the wall 1003 may trigger the stop control module along the wall 1000 for looking for another wall.

5. The module of detecting charging dock 1004, is configured to control the driving device 105 to drive the self-propelled apparatus 10 firstly to advance a default distance (such as 20 centimeters) for entering to the irradiation range of the light-emitting unit 202 of the charging dock 20, and then rotate, such as turning in the first turn direction).

6. The control module for docking 1005, is configured to control the driving device 105 to drive the self-propelled apparatus 10 to rotate (such as rotating in the first turn direction) and move within the irradiation range of the light-emitting unit 202 of the charging dock 20 when the signal light (such as the signal light embedding the first signal) is sensed by the flank sensor 103, controlling the driving device 105 to drive the self-propelled apparatus 10 to rotate in the opposite direction (such as the second turn direction) and move when the different signal light (such as the signal light embedding the second signal) is sensed by the front sensor 102, and controlling the driving device 105 to drive the self-propelled apparatus 10 to rotate in the opposite direction (such as the first turn direction) and move when the different signal light (such as the signal light embedding the first signal) is sensed by the front sensor 102 again, and so on. The control module for docking 1005 is further configured to control the self-propelled apparatus 10 to repeatedly execute the above actions and keep approaching the light-emitting unit 202 of the charging dock 20 until arriving the charging position. The control module for docking 1005 is further configured to control the light emitter 202 to irradiate during rotation.

7. The control module for arrival 1006, is configured to determine that the self-propelled apparatus 10 arrives the charging position when determined by the front sensor 102 that the self-propelled apparatus 10 is very close to the light-emitting unit 202, such as the distance between the self-propelled apparatus 2 and the light-emitting unit 202 is not greater than a default charging distance.

As one of the implementation aspects, after the arrival of the charging position, the control module for arrival 1006 may further control the driving device 105 to turn to make the self-propelled apparatus 10 face the charging dock 20 with a designated orientation (posture).

In one of the implementation aspects, the self-propelled apparatus 10 faces the charging dock 20 with the designated posture when the light emitter 101 aligns with the sensing unit 201 of the charging dock 20.

8. The control module for re-docking 1007, is configured to control the driving device 105 to turn and move to make the self-propelled apparatus 10 move away from the charging dock 20 when determined by the front sensor 102 that the distance between the front sensor 102 and the light-emitting unit 202 of the charging dock 20 is less than the charging distance and the charging is not started, and triggers the control module for searching wall 1000 and the control module for docking 1005 to enable for re-docking at the charging position.

9. The control module for coupling 1008, is configured to control the driving device 105 to drive the self-propelled apparatus 10 to execute a coupling motion (such as approaching the charging dock 20 for a default distance or turning a default angle) to make the electricity connection device 1040 couple in a wired way to the electricity connection unit 2030 of the charging dock 20 when the self-propelled apparatus 10 arrives the charging position (and face the charging dock 20 with a designated posture).

Additionally, the control unit 200 of the charging dock 20 may comprise the following modules for implementing the different functions.

1. The guiding module 2000, is configured to control the light-emitting unit 202 to change to emit the signal light L3 embedding the second signal when the light-emitting unit 202 currently emits the signal light L2 embedding the first signal and the sensing unit 201 is triggered, and control the light-emitting unit 202 to change to emit the signal light L2 embedding the first signal when the light-emitting unit 202 currently emits the signal light L3 embedding the second signal and the sensing unit 201 is triggered.

2. The module for detecting trigger 2001, is configured to start to determine whether the sensing unit 201 is out of the irradiation of the light emitter 101 when the sensing unit 201 is irradiated by the light emitter 101 of the self-propelled apparatus 10, and determine that the sensing unit 201 is triggered by the light emitter 101 when the sensing unit 201 is out of the irradiation of the light emitter 101.

Please be noted that, the above-mentioned modules 1000-1008 and 2000-0001 are connected to each other (such as by electrical connection or information link), and each module could be a hardware module (such as electronic circuit modules, integrated circuit modules, SoC, etc.), a software module or a combination of the hardware module and the software module. This specific example is not intended to limit the scope of the present disclosed example.

Please be noted that if any of the above-mentioned modules 1000-1008 is a software module, such as firmware, operating system or application program, the self-propelled apparatus 10 may comprise a non-transitory computer-readable media (such as the storage 106). The non-transitory computer-readable media stores a computer program 1062. The computer program 1062 records a plurality of computer-readable codes. When the controller 100 executes the above computer-readable codes, the control functions of the corresponding above-mentioned modules 1000-1008 can be achieved.

Additionally, if any of the above-mentioned modules 2000-2001 is the software module, such as firmware, operating system or application program, the charging dock 20 may comprise a non-transitory computer-readable media (such as the storage unit 204). The non-transitory computer-readable media stores a computer program 2040. The computer program 2040 records a plurality of computer-readable codes. When the control unit 200 executes the above computer-readable codes, the control functions of the corresponding above-mentioned modules 2000-2001 can be achieved.

Figure 5:
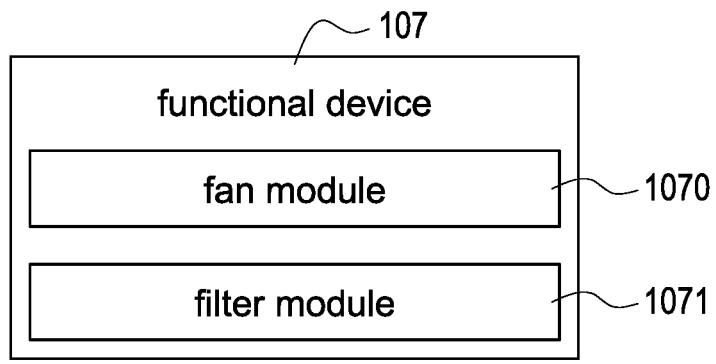
FIG. 5 is the architecture diagram of the functional device according to the fifth implement aspect of the present disclosed example.

Please refer to FIG. 5. FIG. 5 is the architecture diagram of the functional device according to the fifth implement aspect of the present disclosed example. In this implement aspect, the self-propelled apparatus 1 is a self-propelled air cleaning apparatus with the ability to purify the ambient air during movement. More specifically, the functional device 107 comprises the fan module 1070 and the filter module 1071. The fan module 1070 is controlled by the controller 100 to adjust the rotation speed for generating the airflow penetrating the filter module 1071, so as to implement the air-purifying function.

Figure 6:
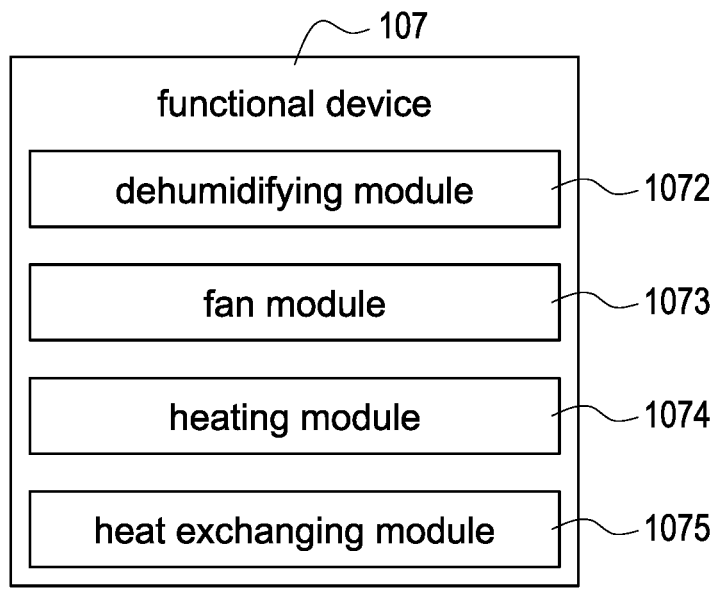
FIG. 6 is the architecture diagram of the functional device according to the sixth implement aspect of the present disclosed example.

Please refer to FIG. 6. FIG. 6 is the architecture diagram of the functional device according to the sixth implement aspect of the present disclosed example. In this implement aspect, the self-propelled apparatus 10 is a self-propelled dehumidification apparatus with the ability to reduce the humidity of the ambient air during movement. More specifically, the functional device 107 comprises the dehumidifying module 1072, the fan module 1073, the heating module 1074, and the heat exchanging module 1075. The dehumidifying module 1072 is used to absorb moisture in the ambient air for generating the dry air. The fan module 1073 is used to make the airflow for outputting the generated dry air. The heating module 1074 is used to evaporate the moisture absorbed by the dehumidifying module 1072 to maintain the ability to absorb moisture. The heat exchanging module 1075 is used to condense and collect the evaporated moisture (water vapor). Thus, the present disclosed example can implement the dehumidification function.

Figure 7:
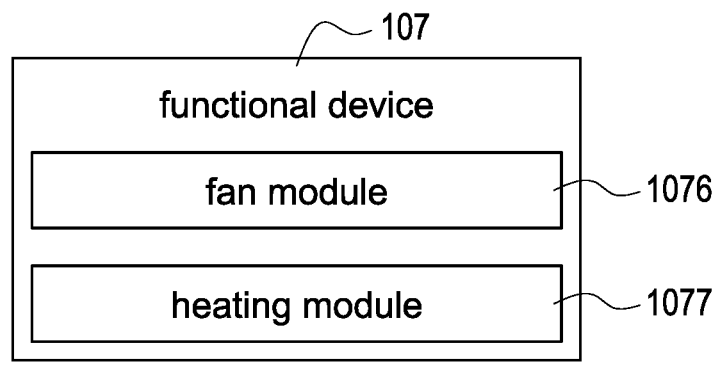
FIG. 7 is the architecture diagram of the functional device according to the seventh implement aspect of the present disclosed example.

Please refer to FIG. 7. FIG. 7 is the architecture diagram of the functional device according to the seventh implement aspect of the present disclosed example. In this implement aspect, the self-propelled apparatus 10 is a self-propelled air-heating apparatus, and has the ability to provide warm air during movement. More specifically, the functional device 107 comprises the fan module 1076 and the heating module 1077. The heating module 1077 is used to heat the ambient air for generating the warm air. The fan module 1076 is used to generate the airflow for outputting the warm air. Thus, the present disclosed example can implement the function of providing warm air.

Figure 8:
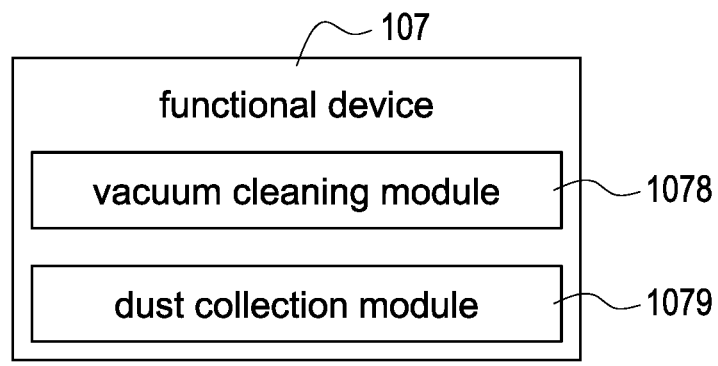
FIG. 8 is the architecture diagram of the functional device according to the eighth implement aspect of the present disclosed example.

Please refer to FIG. 8. FIG. 8 is the architecture diagram of the functional device according to the eighth implement aspect of the present disclosed example. In this implement aspect, the self-propelled apparatus 10 is a sweeping robot with the ability to clean up during movement. More specifically, the functional device 107 comprises the vacuum cleaning module 1078 and the dust collection module 109. The vacuum cleaning module 1078 is used to absorb trash or dust on the floor. The dust collection module 1079 is used to collect the trash or dust being absorbed. Thus, the present disclosed example can implement the cleaning function.

Figure 9:
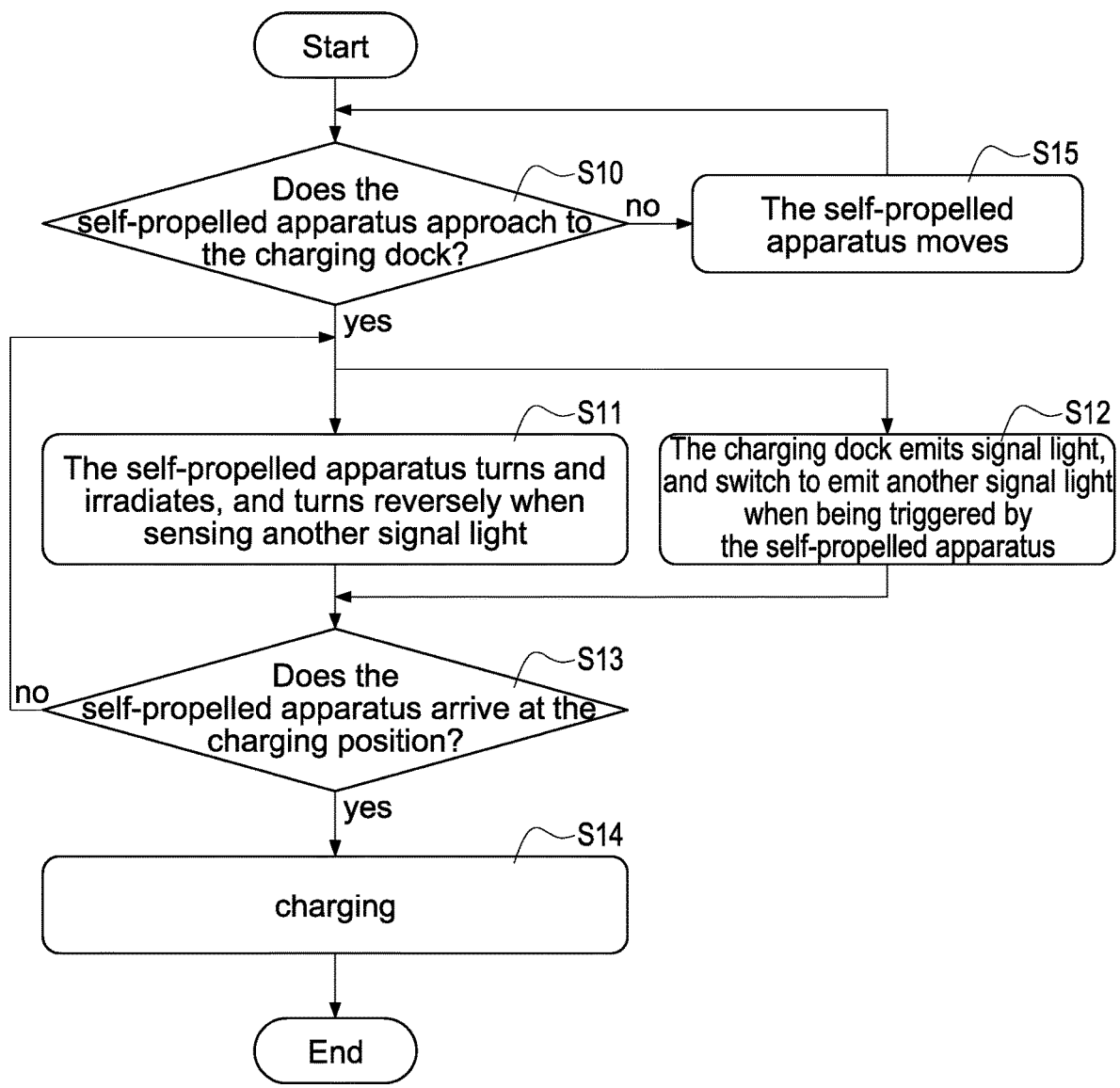
FIG. 9 is the flowchart of the automatic guiding method according to the first embodiment of the present disclosed example.

Please refer to FIG. 9. FIG. 9 is the flowchart of the automatic guiding method according to the first embodiment of the present disclosed example. The automatic guiding method of each embodiment of the present disclosed example may be implemented by system 1 shown in FIG. 1 or system 2 shown in FIG. 2. The following description takes system 1 of FIG. 1 for the explanation.

Step S10: the controller 100 of the self-propelled apparatus 10 determines whether the self-propelled apparatus 10 approaches the charging dock 20.

In one of the exemplary embodiments, the controller 100 determines approaching the charging dock 20 when the flank sensor 103 (could be arranged on one of left-half flank and right-half flank of the self-propelled apparatus 10) senses the signal light (such as the signal light embedding the first signal L2 or the second signal L3) emitted by the light-emitting unit 202 of the charging dock 20.

If the self-propelled apparatus 10 approaches the charging dock 20, the self-propelled apparatus 10 executes step S11. At the same time, the self-propelled apparatus 10 may execute step S12.

Step S11: through the control module for docking 1005, the controller 100 controls the driving device 105 to turn the self-propelled apparatus 10 (such as turning in the first turn direction), and controls the light emitter 101 to irradiate (such as emitting the signal light embedding the signal L1) during the turn.

Moreover, during the turn, the controlling 100 controls the driving device 105 to drive the self-propelled apparatus 10 to approach the light-emitting unit 202 of the charging dock 20, such as approaching the driving device 20 the default distance each time when turning the default angle, or approaching the charging dock 20 while turning.

Additionally, the controller 100 may control the driving device 105 to turn reversely when the front sensor 102 senses the another signal light emitted by the light-emitting unit 202 of the charging dock 20 (namely, detection of the signal light emitted by the light-emitting unit 202 is changed) each time.

For example, the self-propelled apparatus 10 turns in the second turn direction opposite to the current first turn direction when it is the first time to detect the change of signal light, such that the first signal L2 changes in response to the second signal L3; the self-propelled apparatus 10 turns in the first turn direction opposite to the current second turn direction when it is the second time to detect the change of signal light, such that the second signal L3 changes in response to the first signal L2, and so on.

In one of the exemplary embodiments, the self-propelled apparatus 10 executes the above-mentioned turns and motions within the irradiation range of the light-emitting unit 202. Thus, the present disclosed example can effectively prevent the self-propelled apparatus 10 from getting lost.

Step S12: the control unit 200 of the charging dock 20 emits the signal light, and switches to emit another signal light when being triggered by the self-propelled apparatus 10.

More specifically, the control unit 200 is triggered when the sensing unit 201 senses the self-propelled apparatus 10 (such as the sensing unit 201 being irradiated by the signal light emitted by the self-propelled apparatus) each time.

For example, the sensing unit 201 originally emits the signal light embedding the first signal L2. The sensing unit 201 changes to emit the signal light embedding the second signal L3 when it is the first time to be irradiated by the signal light embedding the signal L1 emitted by the self-propelled apparatus 10, changes to emit the signal light embedding the first signal when it is the second time to be irradiated by the signal light embedding the signal L1 emitted by the self-propelled apparatus 10, and so on.

Step S13: the controller 100 determines whether the self-propelled apparatus arrives at the charging position.

In one of the exemplary embodiments, the controller 100 may determine whether the self-propelled apparatus 10 arrives at the charging position based on the distance of the light emitter 101 to the sensing unit 201, the distance of the front sensor 102 or the flank sensor 103 to the light-emitting unit 202, whether the electrical device 104 couples to the electrical unit 203, and so forth.

If the self-propelled apparatus 10 does not arrive at the charging position, the steps S11 and S12 are executed again for continuing to guide the self-propelled apparatus 10 to gradually shorten the distance to the charging position.

If the self-propelled apparatus 10 arrives at the charging position, step S14 is executed: the controller 100 receives the electricity from the electrical unit 203 after the electrical device 104 is connected to the electrical unit 203, and charges up the battery of the electrical device 104.

If the self-propelled apparatus 10 does not approach the charging dock 20 in the step S10, step S15 is executed: the controller 100 controlling the driving device 105 moves the self-propelled apparatus 10 (such as random movement or moving along the wall) to continue to search for the charging dock 20.

Thus, the present disclosed example can accurately guide the self-propelled apparatus to the charging position by arranging only two sensors (the front sensor and the flank sensor) arranged on the self-propelled apparatus.

Figure 14A:
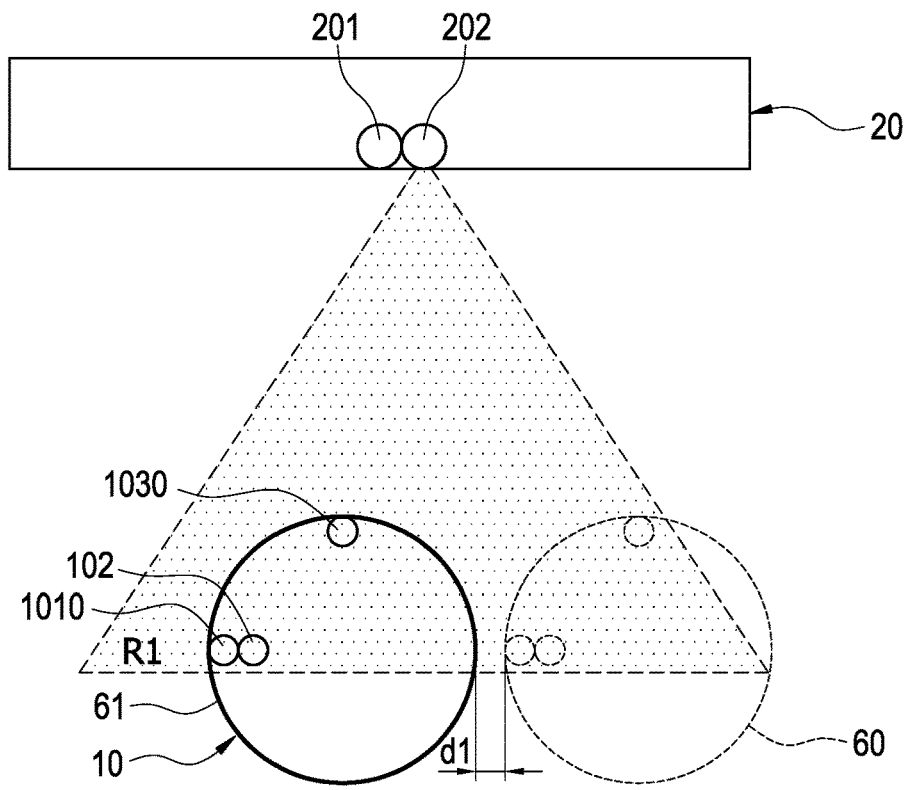
FIG. 14A is the first schematic view of guiding according to the second example of the present disclosed example.
Figure 14B:
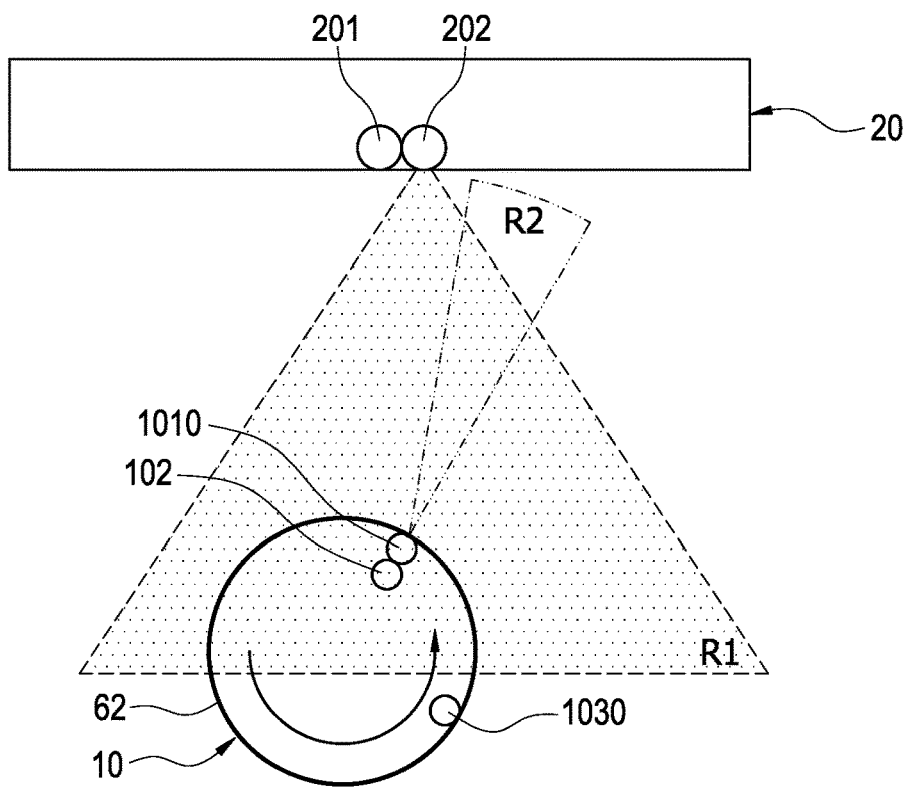
FIG. 14B is the second schematic view of guiding according to the second example of the present disclosed example.
Figure 14C:
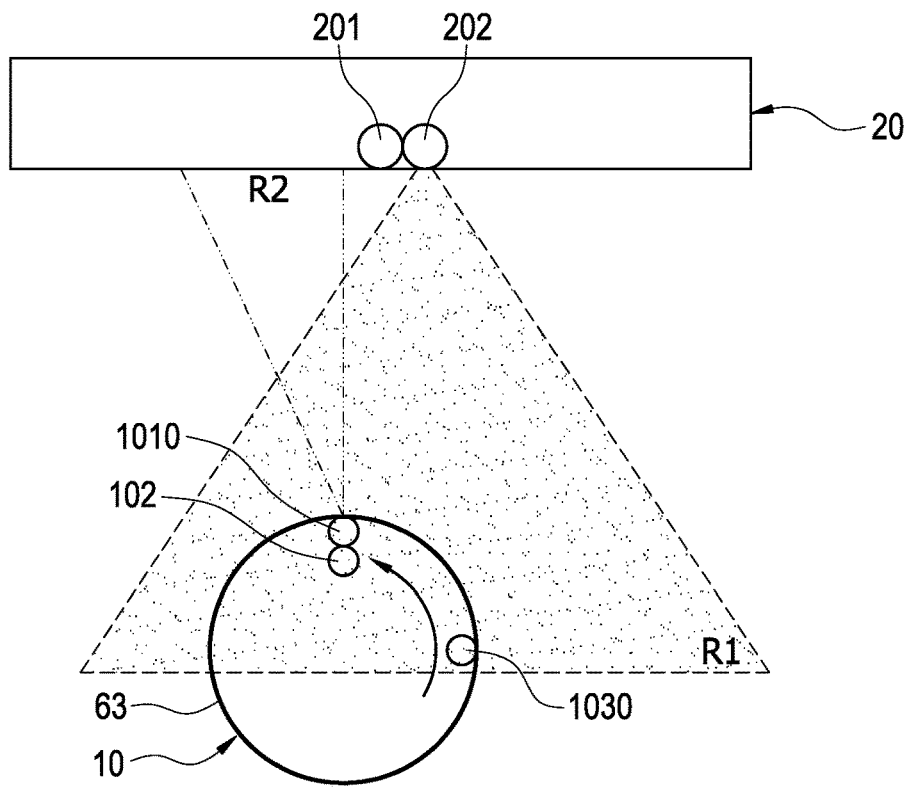
FIG. 14C is the third schematic view of guiding according to the second example of the present disclosed example.
Figure 14D:
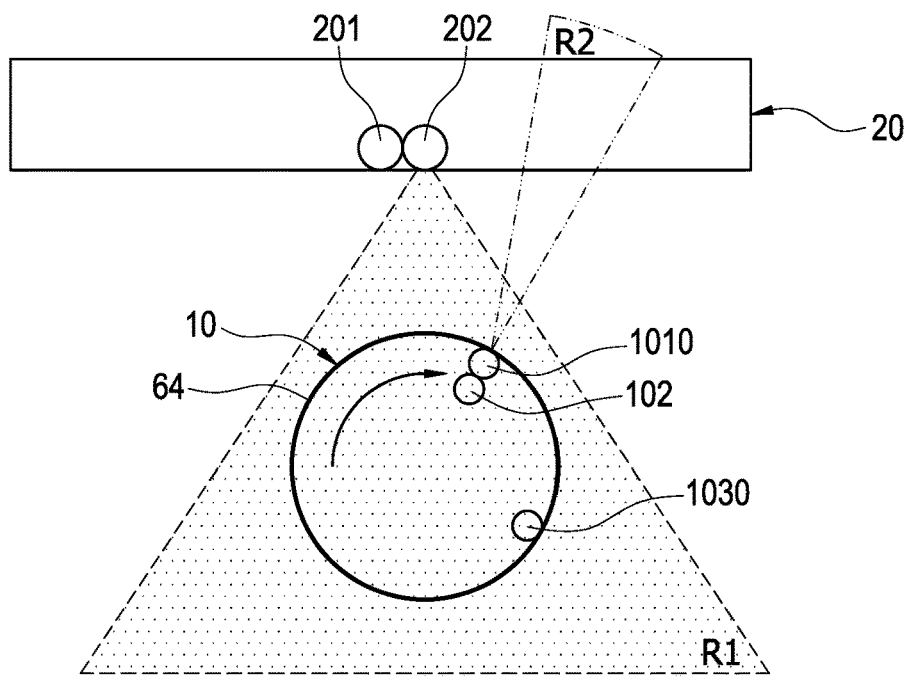
FIG. 14D is the fourth schematic view of guiding according to the second example of the present disclosed example.
Figure 14E:
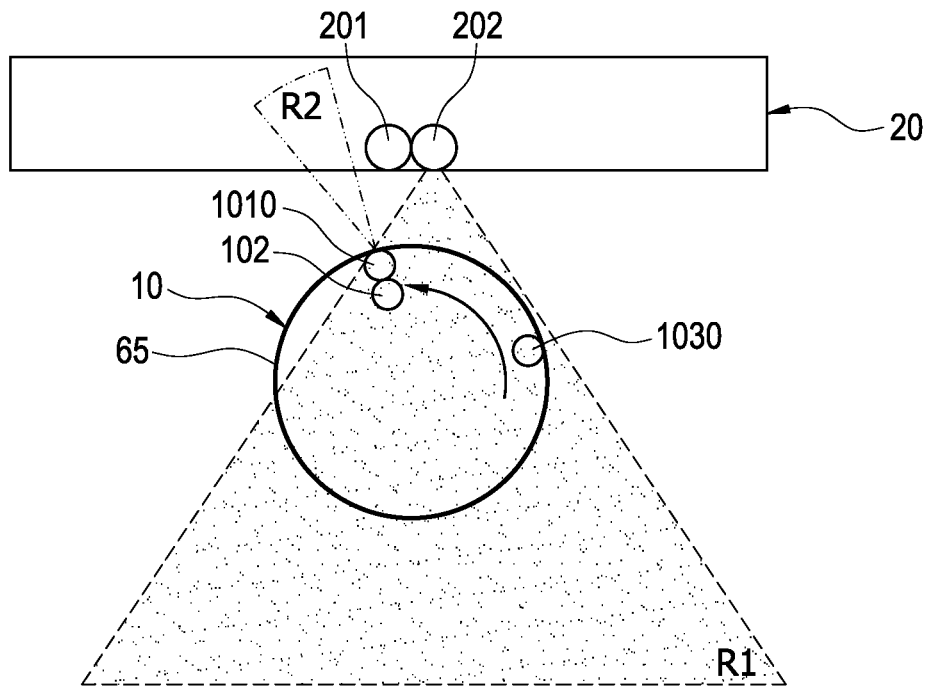
FIG. 14E is the fifth schematic view of guiding according to the second example of the present disclosed example.
Figure 14F:
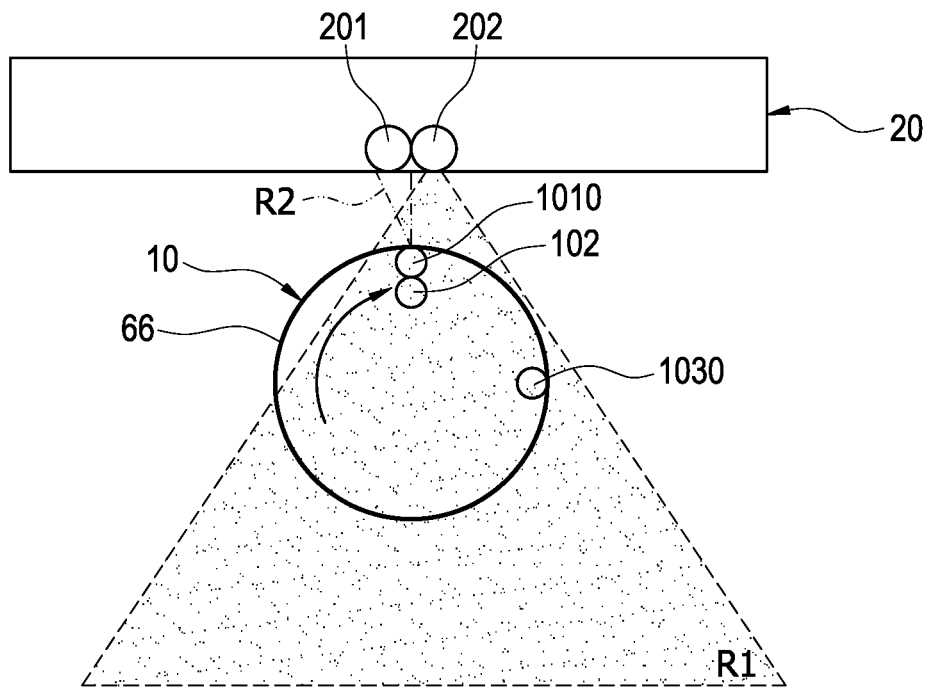
FIG. 14F is the sixth schematic view of guiding according to the second example of the present disclosed example.

Please refer to FIG. 14A to FIG. 14F simultaneously. FIG. 14A is the first schematic view of guiding according to the second example of the present disclosed example, FIG. 14B is the second schematic view of guiding according to the second example of the present disclosed example, FIG. 14C is the third schematic view of guiding according to the second example of the present disclosed example, FIG. 14D is the fourth schematic view of guiding according to the second example of the present disclosed example, FIG. 14E is the fifth schematic view of guiding according to the second example of the present disclosed example, and FIG. 14F is the sixth schematic view of guiding according to the second example of the present disclosed example.

In this example, the flank sensor 103 of the self-propelled apparatus 10 comprises the right flank sensor 1030 arranged on the rear right flank or the rightmost flank of the case 109, the right flank sensor 1030 is configured to sense(detect) toward the rear right flank or the rightmost flank of the self-propelled apparatus 10. The light emitter 101 comprises the left light emitter 1010, the left light emitter 1010 irradiates toward the front left-half flank of the self-propelled apparatus 10 and not irradiate the front right-half flank of the self-propelled apparatus 10.

As shown in FIG. 14A, the light-emitting unit 202 of the charging dock 20 emits the signal light embedding the first signal L2 to the irradiation range R1. When the self-propelled apparatus 10 enters the irradiation range R1 (at the position 60), the signal light embedding the first signal L2 emitted by the charging dock 20 is sensed by the right flank sensor 1030. Then, the self-propelled apparatus 10 advances a default distance d for making sure the self-propelled apparatus 10 is complete within the irradiation range R1 (the operation of advancing may be omitted on another example). Namely, the self-propelled apparatus 10 moves to position 61.

Then, as shown in FIG. 14B, the self-propelled apparatus 10 at the position 62 may continuously emit the signal light L1 toward the front right-half flank (the irradiation range R2), and turn in the first turn direction. In this example, the self-propelled apparatus 10 turns in the direction of leaving from the charging dock 20 (namely, the counterclockwise direction), and may further slightly move away from the charging dock 20. Thus, the example can prevent the self-propelled apparatus 10 from collision with the charging dock 20 during turning caused by being too close to the charging dock 10.

Then, as shown in FIG. 14C, during the self-propelled apparatus 10 at the position 63 turning in the first turn direction, the signal light L1 will irradiate the sensing unit 201 of the charging dock 20 and trigger the charging dock 20 to control the light-emitting unit 202 to switch to emit the signal light embedding the second signal L3.

Then, as shown in FIG. 14D, the self-propelled apparatus 10 moves toward the charging dock 20 to position 64 and turns in the second turn direction (namely the clockwise direction) opposite to the current first turn direction when the front sensor 102 senses the signal light embedding the second signal L3. Moreover, as the self-propelled apparatus 10 turns in the second turn direction, the signal light embedding the signal L1 will irradiate the sensing unit 201 of the charging dock 20 again, and the charging dock 20 is triggered to control the light-emitting unit 202 to switch on the signal light embedding the first signal L2.

Then, as shown in FIG. 14E, the self-propelled apparatus 10 moves toward the charging dock 20 to position 65 and turns in the first turn direction opposite to the current second turn direction when the front sensor 102 senses the signal light embedding the first signal L2. Moreover, during the self-propelled apparatus 10 turn, the signal light embedding the signal L1 will irradiate the sensing unit 201 again, and the charging dock 20 is triggered to control the light-emitting unit 202 to switch on the signal light embedding the second signal L3.

Then, as shown in FIG. 14F, the self-propelled apparatus 10 moves toward the charging dock 20 to position 66 and turns in the second turn direction when the front sensor 102 senses the signal light embedding the second signal L3. Moreover, the self-propelled apparatus 10 and the charging dock 20 determine that the self-propelled apparatus 10 arrives at the charging position when the sensing unit 201 is irradiated by the signal light embedding the signal L1, and finishes this execution of the guide.

Figure 16A:
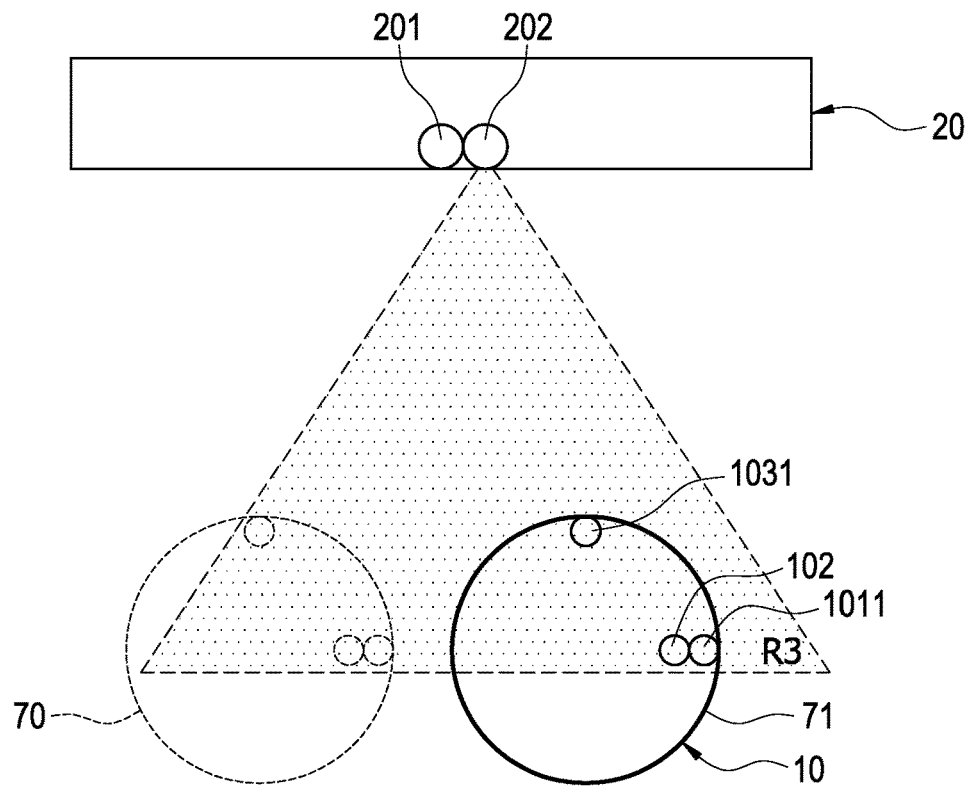
FIG. 16A is the first schematic view of guiding according to the fourth example of the present disclosed example.
Figure 16B:
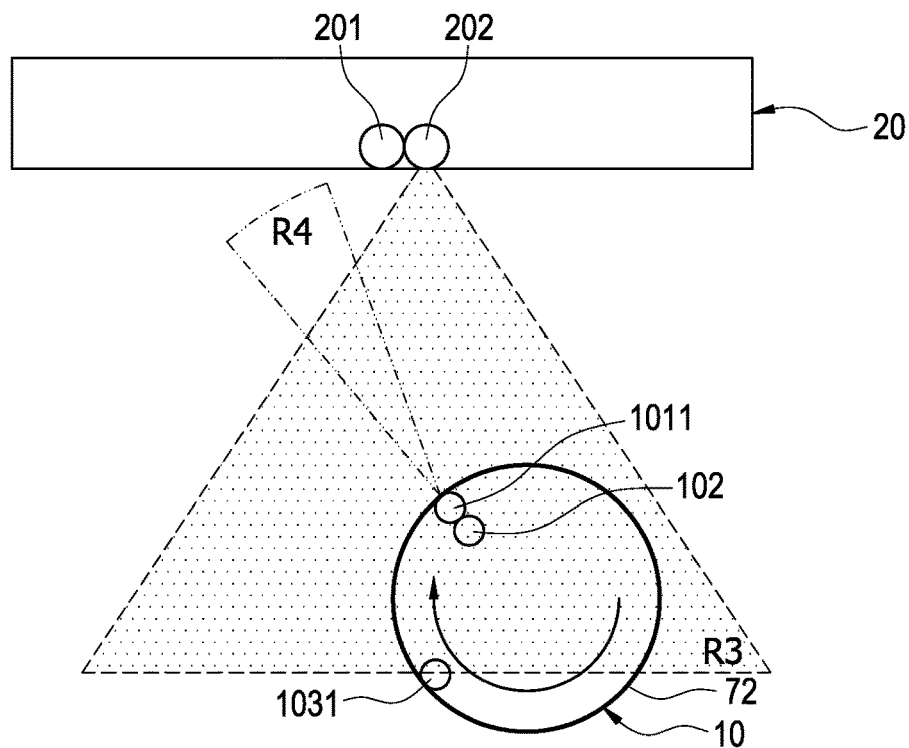
FIG. 16B is the second schematic view of guiding according to the fourth example of the present disclosed example.
Figure 16C:
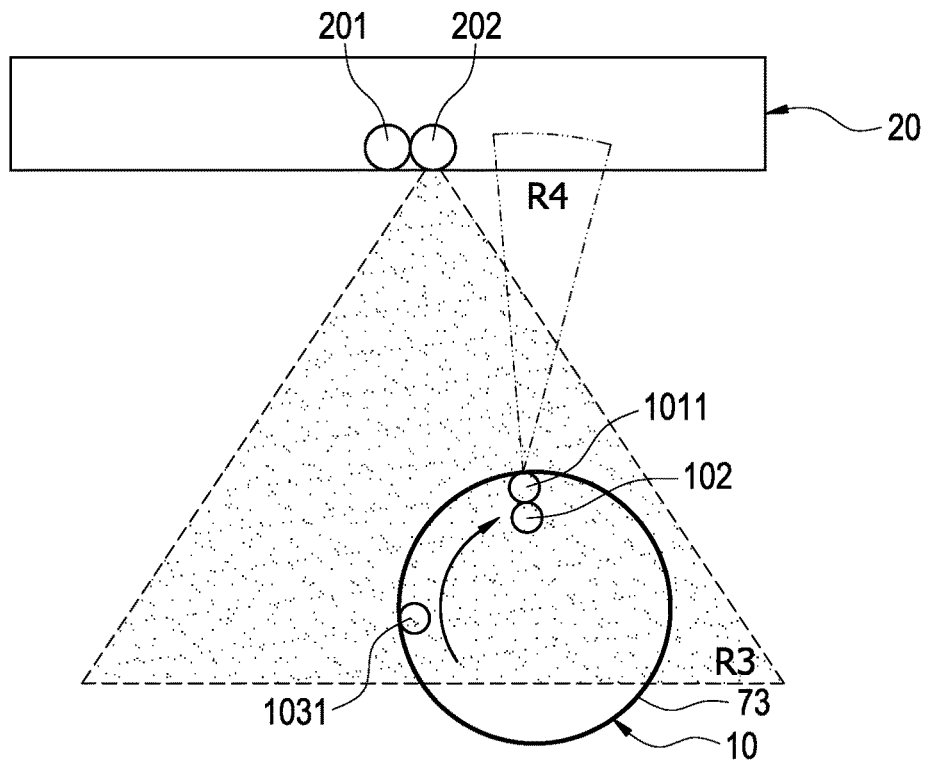
FIG. 16C is the third schematic view of guiding according to the fourth example of the present disclosed example.
Figure 16D:
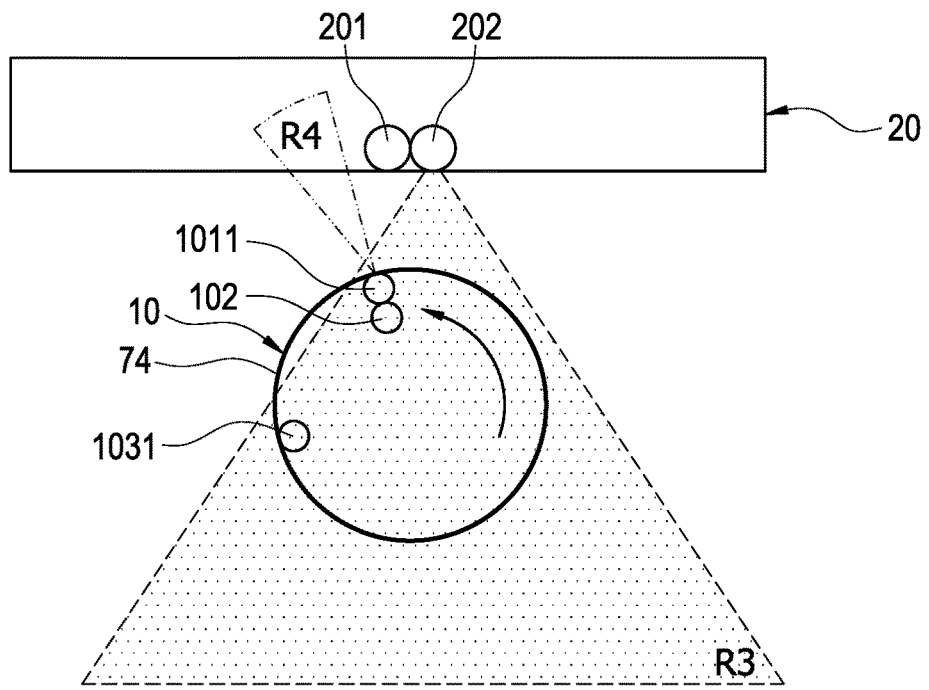
FIG. 16D is the fourth schematic view of guiding according to the fourth example of the present disclosed example.
Figure 16E:
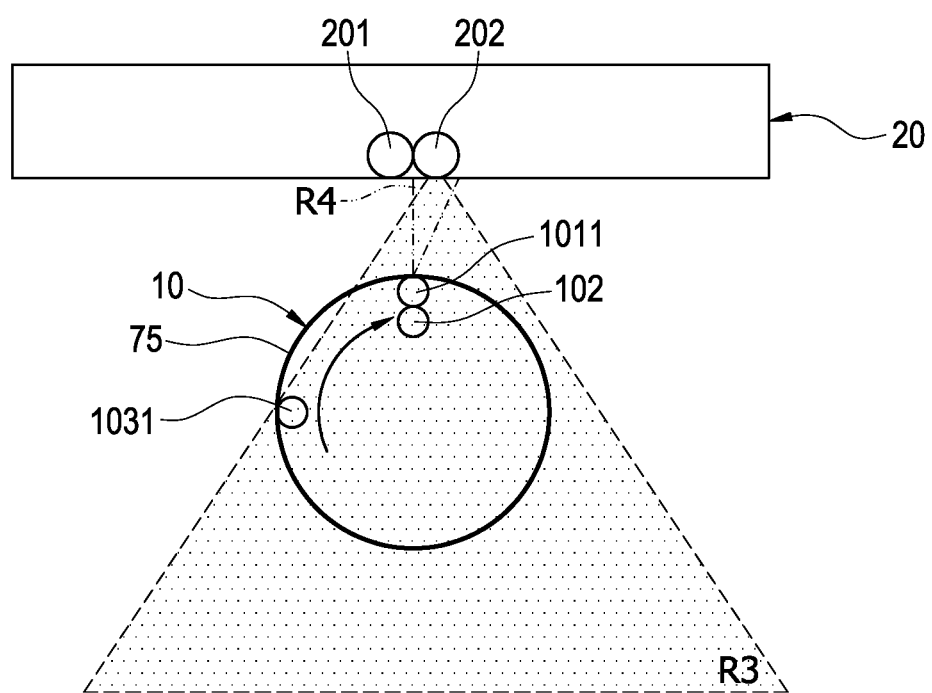
FIG. 16E is the fifth schematic view of guiding according to the fourth example of the present disclosed example.

Please refer to FIG. 16A to FIG. 16E simultaneously. FIG. 16A is the first schematic view of guiding according to the fourth example of the present disclosed example, FIG. 16B is the second schematic view of guiding according to the fourth example of the present disclosed example, FIG. 16C is the third schematic view of guiding according to the fourth example of the present disclosed example, FIG. 16D is the fourth schematic view of guiding according to the fourth example of the present disclosed example, and FIG. 16E is the fifth schematic view of guiding according to the fourth example of the present disclosed example.

In this example, the flank sensor 103 of the self-propelled apparatus 10 comprises the left flank sensor 1031 arranged on the rear left flank or the leftmost flank of the case 109, and the left flank sensor 1031 is configured to sense(detect) toward the rear left flank or the leftmost flank of the self-propelled apparatus 10. The light emitter 101 comprises the right light emitter 1011, the right light emitter 1011 irradiates toward the front right-half flank of the self-propelled apparatus 10 and does not irradiate the front left-half flank of the self-propelled apparatus 10.

As shown in FIG. 16A, the light-emitting unit 202 of the charging dock 20 emits the signal light embedding the first signal L2 to the irradiation range R3. When the self-propelled apparatus 10 enters the irradiation range R3 (at the position 70), the signal light embedding the first signal L2 emitted by the charging dock 20 is sensed by the left flank sensor 1031. Then, the self-propelled apparatus 10 advances a default distance for making sure most parts of the self-propelled apparatus 10 are within the irradiation range R3 (the operation of advancing may be omitted on another example). Namely, the self-propelled apparatus 10 moves to position 71.

Then, as shown in FIG. 16B, the self-propelled apparatus 10 at the position 72 may continuously emit the signal light L1 towards the front left-half flank (the irradiation range R4), and turns in the first turn direction. In this example, the self-propelled apparatus 10 turns in the direction of leaving from the charging dock 20 (namely, the clockwise direction), and may further slightly move away from the charging dock 20. Thus, the example can prevent the self-propelled apparatus 10 from colliding with the charging dock 20 during turning caused by being too close to the charging dock 10.

Then, as shown in FIG. 16C, as the self-propelled apparatus 10 at the position 73 turns in the first turn direction, the signal light L1 will irradiate the sensing unit 201 of the charging dock 20 and trigger the charging dock 20 to control the light-emitting unit 202 to switch to emit the signal light embedding the second signal L3.

Then, as shown in FIG. 16D, the self-propelled apparatus 10 approaches the charging dock 20 to position 74 and turns in the second turn direction (namely the counterclockwise direction) opposite to the current first turn direction when the front sensor 102 senses the signal light embedding the second signal L3. Moreover, as the self-propelled apparatus 10 turns in the second turn direction, the signal light embedding the signal L1 will irradiate the sensing unit 201 of the charging dock 20 again, and the charging dock 20 is triggered to control the light-emitting unit 202 to switch to emit the signal light embedding the first signal L2.

Then, as shown in FIG. 16E, the self-propelled apparatus 10 approaches the charging dock 20 at position 75 and turns in the first turn direction opposite to the current second turn direction when the front sensor 102 senses the signal light embedding the first signal L2. Moreover, the self-propelled apparatus 10 and the charging dock 20 determine that the self-propelled apparatus 10 arrives at the charging position when the sensing unit 201 is irradiated by the signal light embedding the signal L1, and finishes this execution of the guide.

Figure 10:
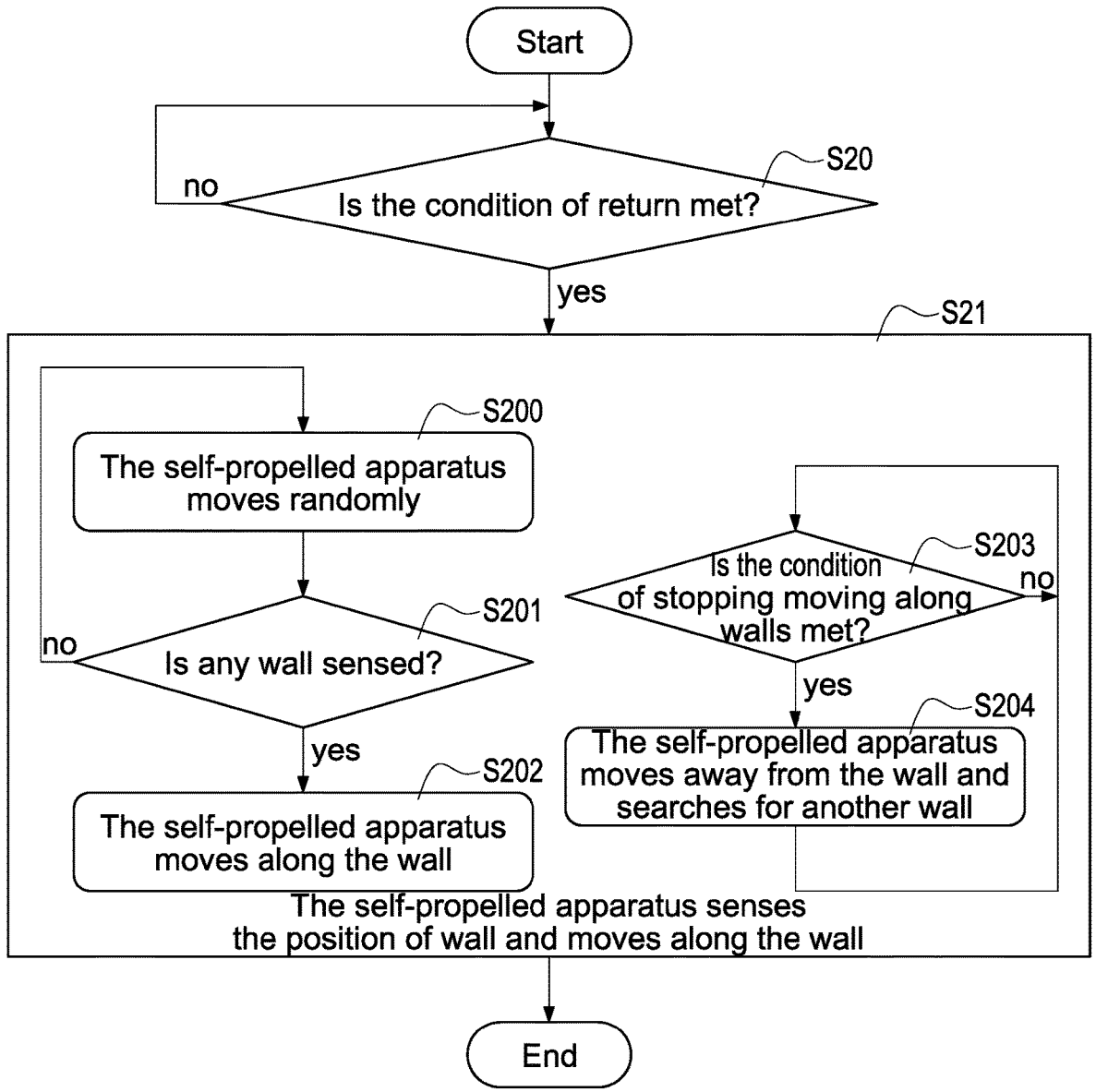
FIG. 10 is the flowchart of the automatic return according to the second embodiment of the present disclosed example.

Please refer to FIG. 10. FIG. 10 is the flowchart of the automatic return according to the second embodiment of the present disclosed example. FIG. 10 is used to explain how the present disclosed example makes the self-propelled apparatus 10 move to the position approaching the charging dock 20 automatically for docking the self-propelled apparatus 10 at the charging position by the automatic guide. The self-propelled apparatus 10 seeks and approaches the charging dock 20 through execution of the following steps.

Step S20: the controller 100 determines whether the default condition of return is met.

The above-mentioned condition of return may comprise: a remaining electricity level of the battery lower than a default return electricity threshold; an elapsed default return time; and/or an accomplished mission (such as the air quality or humidity of the ambient air satisfies the standard, or the designated zone is cleared).

If the condition of return is not met, the step S20 is executed again for continuous monitoring.

If the condition of return is met, step S21 is executed: the controller 100 uses the control module for searching wall 1000 to detect the position of the wall by the front sensor 102 and/or the flank sensor 103, and controls the self-propelled apparatus 10 to move along the wall for searching for the charging dock 20.

In one of the exemplary embodiments, the controller 100 may implement searching the wall and moving along the wall by execution of the following steps S200-S202.

Step S200: using the control module for random movement 1001, the controller 100 controls the driving device 105 to randomly move the self-propelled apparatus 10 to roam.

In one of the exemplary embodiments, the control module for random movement 1001 may plan a movement route generated randomly or generate the random moving command, but this specific example is not intended to limit the scope of the present disclosed example.

Step S201: the controller 100 senses whether any wall is located nearby by the front sensor 102 and/or the flank sensor 103 during random movement.

If there is no wall being sensed, the step S200 is executed again for continuously searching for the wall.

If any wall is sensed, step S202 is executed: using the control module for moving along walls 1002, the controller 100 controls the driving device 105 to move along the wall being sensed, for making the self-propelled apparatus 10 start to detour the sensed wall and search for the charging dock 20.

In one of the exemplary embodiments, during moving along the wall, the controller 100 controls the flank sensor 103 to sense toward the wall for continuously detecting the position of the wall and implement detouring the wall.

In one of the exemplary embodiments, it is possible to have a plurality of walls in the same environment, to prevent the self-propelled apparatus 10 from return failure (such as exhausting the electricity) caused by spending too much time searching at the wrong wall (such as the wall without arranging the charging dock 20), the controller 100 may further implement a function of stopping, moving along the wall, and re-searching the wall by the execution of the following steps S203-S204 for changing the wall being detoured timely and increasing the probability of a successful return.

Step S203: the controller 100 determines through the control module for stopping movement along walls 1003 whether the condition of stopping movement along walls is met and whether the charging dock 20 is sensed.

In one of the exemplary embodiments, the above-mentioned condition of stopping movement along walls may comprise: all parts of the wall detoured, continuously detouring over the default time and failing to sense the charging dock 20, and/or so forth.

If the condition of stopping movement along walls is not met and the charging dock 20 is not sensed, the detection will be continued.

If the condition of stopping movement along walls is met and the charging dock 20 is not sensed, step S204 is executed: the controller 100 controlling the self-propelled apparatus 10 to move away from the wall currently detouring when the condition of stopping movement along walls is met and the charging dock 20 is not sensed, and re-searching another wall using the control module for searching wall 100 (such as executing the steps S200-S202 again).

Thus, the present disclosed example can effectively find the wall which the charging dock 20 is arranged, and successfully find the charging dock 20 by moving along the wall, and does not require the need for indoor positioning technology or additional sensors.

Figure 19:
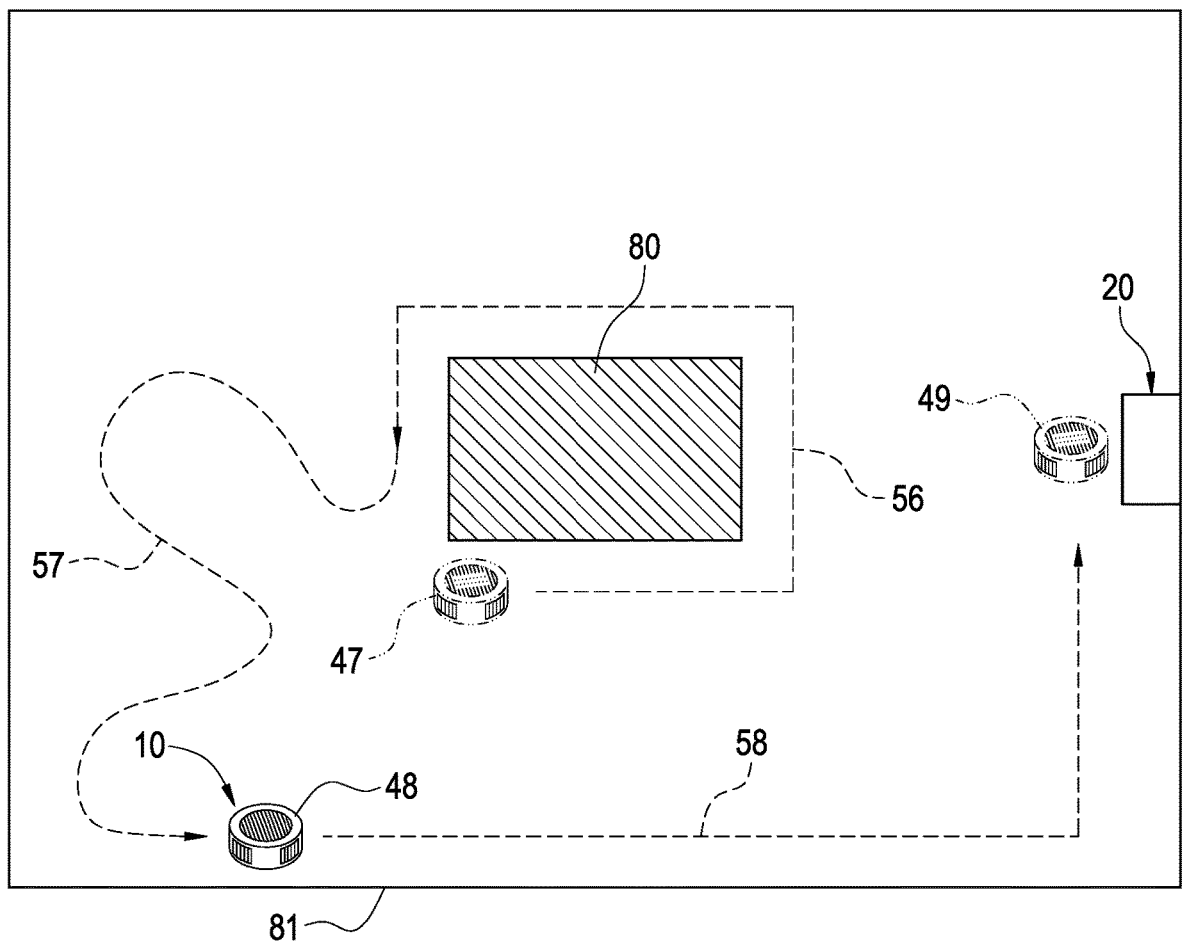
FIG. 19 is the schematic view of searching for a wall according to the seventh example of the present disclosed example.

Please refer to FIG. 19 simultaneously. FIG. 19 is the schematic view of searching for a wall according to the seventh example of the present disclosed example. FIG. 19 is used to explain how the present disclosed example finds the charging dock 20.

In this example, the charging dock 20 is arranged on the wall 81 and the self-propelled apparatus 10 does not sense the charging dock 20 after detouring the wall 80 for a cycle from position 47 along the route 56. namely, when the condition of stopping movement along walls is met.

Then, the self-propelled apparatus 10 stops moving along the wall 80, moves away from the wall 80 along the random route 57, and detects the wall 81 at the position 48.

Then, the self-propelled apparatus 10 starts to move along the route 58 to move along the wall 58, and finds the charging dock 20 at the position 49.

Figure 13:
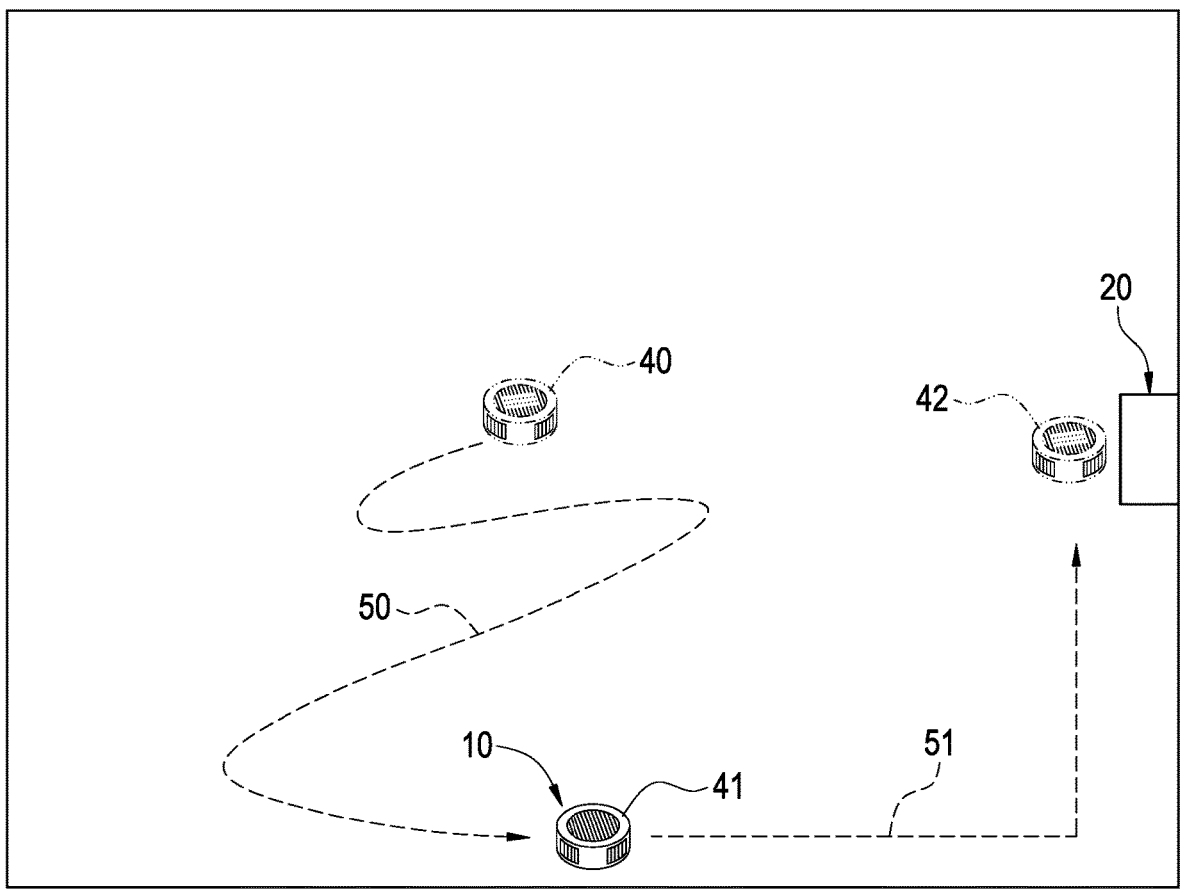
FIG. 13 is the schematic view of return according to the first example of the present disclosed example.

Please refer to FIG. 13 simultaneously. FIG. 13 is the schematic view of return according to the first example of the present disclosed example. FIG. 13 is used to explain how the self-propelled apparatus 10 finds the charging dock 20 using the right flank sensor 1030.

As shown in the figures, the self-propelled apparatus 10 randomly moves from the position 40 along the random route 50, and detects the wall using the front sensor 102 or the right flank sensor 1030 at the position 41.

Then, the self-propelled apparatus 10 may turn to allow the right flank sensor 1030 to sense toward the wall, and move along route 51 along the wall to the position 42 (such as detouring in counterclockwise), and find the charging dock 20 (such as entering the irradiation range of the light emitter 202). Moreover, during movement along the wall, the self-propelled apparatus 10 may make the right flank sensor 1030 keep a fixed distance from the wall continuously by additional movement, so as to implement the function of moving along walls.

Figure 15:
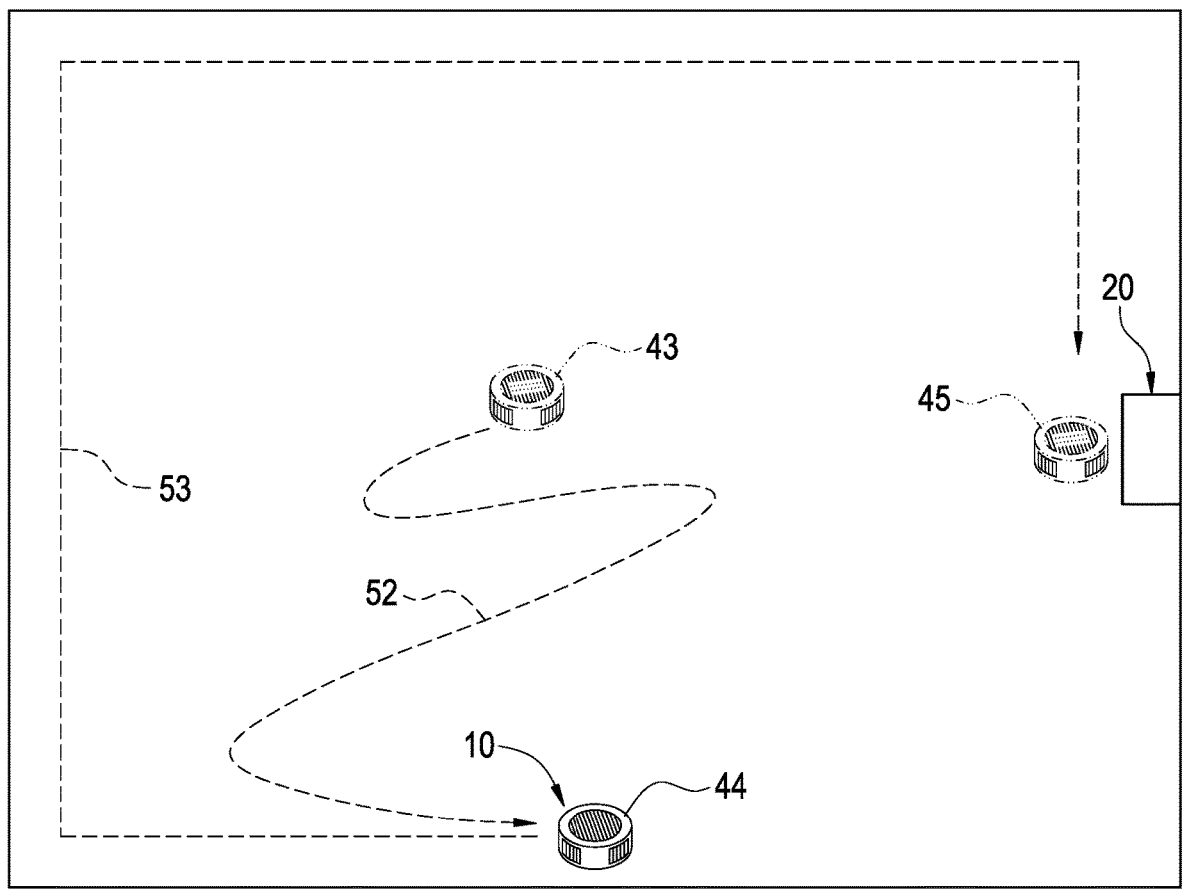
FIG. 15 is the schematic view of return according to the third example of the present disclosed example.

Please refer to FIG. 15. FIG. 15 is the schematic view of return according to the third example of the present disclosed example. FIG. 15 is used to explain how the self-propelled apparatus 10 finds the charging dock 20 using the left flank sensor 1031.

As shown in figure, the self-propelled apparatus 10 randomly moves from the position 43 along the random route 52, and detects the wall by the front sensor 102 or the left flank sensor 1031 at the position 44.

Then, the self-propelled apparatus 10 may turn to allow the left flank sensor 1031 to sense toward the wall, and move along route 53 along the wall to the position 45 (such as detouring in clockwise), and find the charging dock 20. Moreover, during movement along the wall, the self-propelled apparatus 10 may make the left flank sensor 1031 keep a fixed distance from the wall continuously by additional movement, so as to implement the function of moving along walls.

Figure 11:
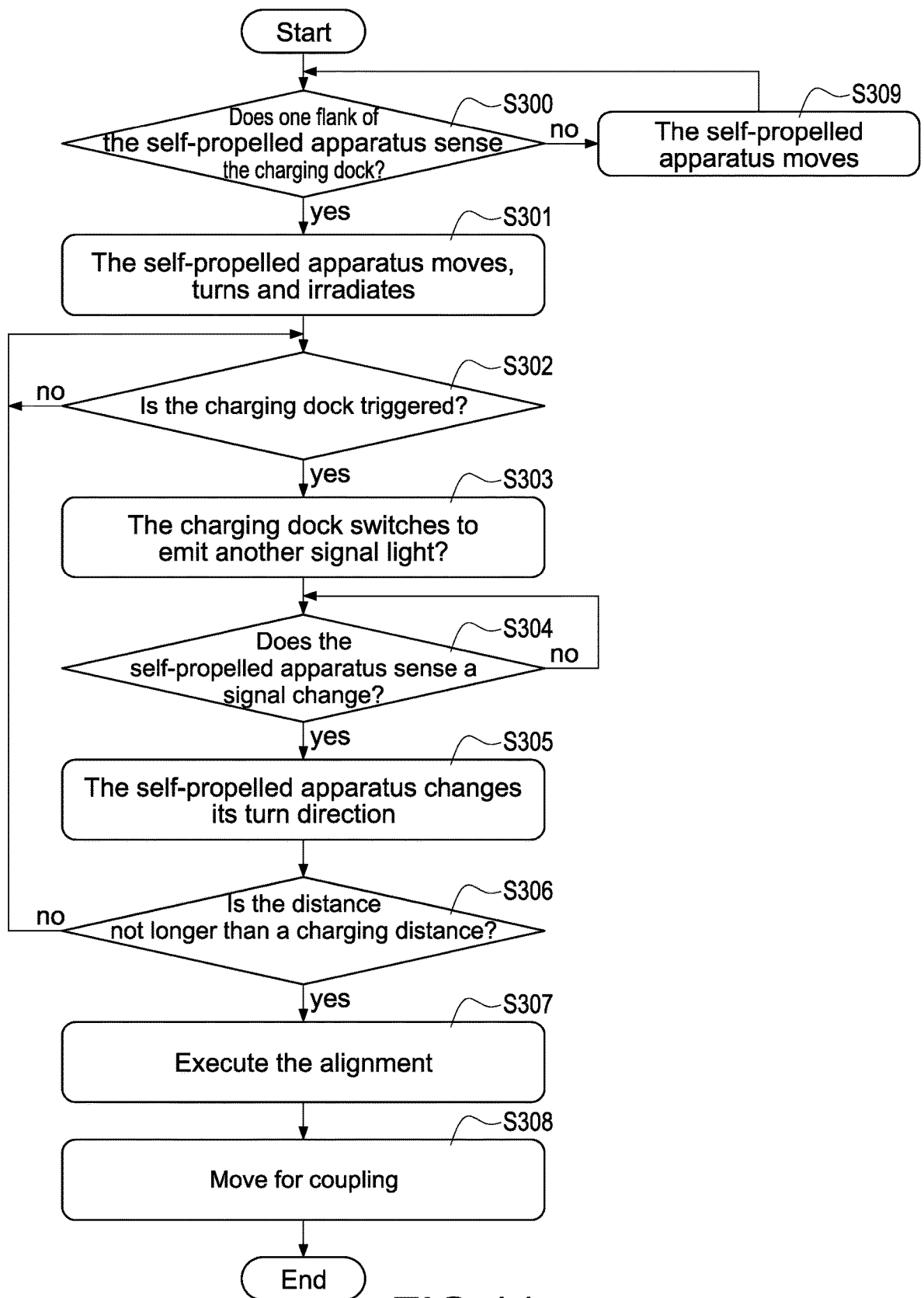
FIG. 11 is the flowchart of the automatic guiding method according to the third embodiment of the present disclosed example.

Please refer to FIG. 11 simultaneously. FIG. 11 is the flowchart of the automatic guiding method according to the third embodiment of the present disclosed example. The automatic guiding method of this embodiment of the present disclosed example is implemented by system 2 shown in FIG. 2.

Step S300: the controller 100 of the self-propelled apparatus 10 determines using the module of detecting charging dock 1004 whether the flank sensor 103 senses the charging dock 20. Namely, determining whether either the right flank sensor 1030 or the left flank sensor 1031 is irradiated by the light-emitting unit 202 of the charging dock 20.

If the charging dock 20 is sensed, the self-propelled apparatus 10 executes step S301: the controller 100 controlled by the control module for docking 1005 the self-propelled apparatus 10 advances a default distance to allow more parts of the self-propelled apparatus 10 to enter the irradiation range of the light-emitting unit 202, turn, and control the light emitter 101 to emit the signal light embedding the signal L1 during the turn.

Please note that for the self-propelled apparatus 10, if the right flank sensor 1030 is irradiated by the charging dock 10, the following steps S302-S306 is executed to use the left light emitter 1010 to emit the signal light embedding the signal L1; if the left flank sensor 1031 is irradiated by the charging dock 10, the following steps S302-S306 is executed to use the right light emitter 1011 to emit the signal light embedding the signal L1.

Step S302: the control unit 200 of the charging dock 20 determines using the module for detecting trigger 2001 whether the charging dock 20 is triggered by the sensing unit 201, such as determining whether the sensing unit 201 is irradiated by the signal light embedding the signal L1 emitted by the self-propelled apparatus 10.

In one of the exemplary embodiments, the control unit 200 starts to determine whether the sensing unit 201 is out of the irradiation when the sensing unit 201 starts to be irradiated, and determines that the sensing unit 201 is triggered when the sensing unit 201 leaves from the irradiation.

If the sensing unit 201 of the charging dock 20 is not triggered, step S302 is executed again for continuous sensing.

If the sensing unit 201 of the charging dock 20 is triggered, step S303 is executed: the control unit 200 controls using the guiding module 2000 the light-emitting unit 202 to switch the signal, such as switching the signal light embedding the first signal into the signal light embedding the second signal, or switching the signal light embedding the second signal into the signal light embedding the first signal.

Step S304: by using the control module for docking 1005, the controller 100 senses by the front sensor 102 whether the signal light emitted by the charging dock 20 is changed.

If the signal light emitted by the charging dock 20 is not changed, the step S304 is executed again for continuously turning, moving and sensing.

If the signal light emitted by the charging dock 20 is changed, step S305 is executed: the controller 100 controlled by the control module for docking 1005 the driving device 105 to reversely rotate when sensing that the signal light is emitted by the charging dock 20 is changed each time.

Step S306: the control unit 200 determines using the control module for docking 1005 whether the distance between the self-propelled apparatus 10 and (the light-emitting unit 202 of) the charging dock 20 is not greater than the default charging distance (such as 0.5 centimeters, 3 centimeters, 10 centimeters), so as to for determine whether the self-propelled apparatus arrives at the charging position.

If the distance between the self-propelled apparatus 10 and the charging dock 20 is greater than the charging distance, the determination is "no arrival of charging position", and the steps S302-S306 are executed again.

If the distance between the self-propelled apparatus 10 and the charging dock 20 is not greater than the charging distance, the determination is "arrival of charging position", and step S307 is executed: the controller 100 executing the alignment using the control module for arrival 1006 for making the self-propelled apparatus 10 turns and sets the reference posture, such as making the light emitter 101 align with the sensing unit 201 of the charging dock 20, or making the front sensor 102 or flank sensor 103 align with the light-emitting unit 202.

Step S308: using the control module for coupling 1008, the controller 100 executes the coupling motion by using the driving device 108 (such as approaching the charging dock 20 for a default distance or turning a default angle) for making the electricity connection device 1040 couple to the electricity connection unit 2030 or making the wireless charging device 1041 able to induct with the electricity E3 from the wireless electricity-providing unit 2031.

Please be noted that, the above-mentioned coupling motion is configured based on the above-mentioned reference posture. Namely, when both the self-propelled apparatus 10 and the charging dock 20 pose the reference posture, the electrical device 104 can be connected to the electrical unit 203 for charging by the self-propelled apparatus 10 executing only the default coupling motion.

If the self-propelled apparatus 10 fails to find the charging dock 20 in the step S300, the self-propelled apparatus 10 executes step S309: the controller 100 controls the driving device 105 to move the self-propelled apparatus 10 for continuously searching the charging dock 20, such as the execution of the steps shown in FIG. 10.

Thus, the present disclosed example can guide the self-propelled apparatus 10 to move the charging position of the charging dock 20 more precisely and charge up its battery.

Figure 12:
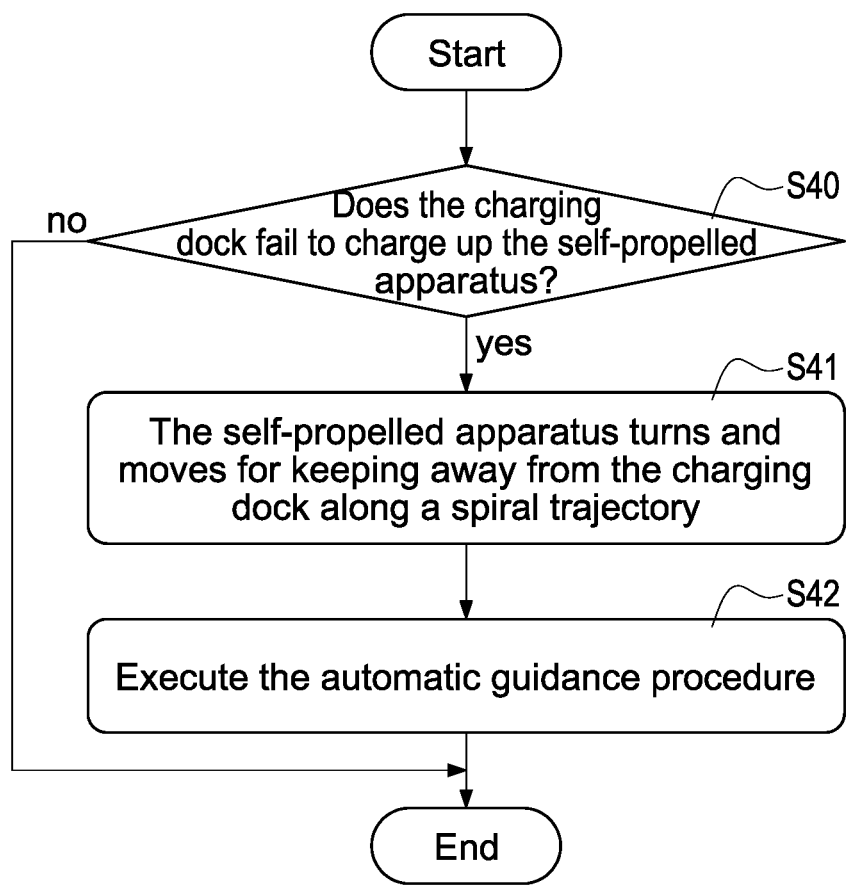
FIG. 12 is the flowchart of the automatically retrying according to the fourth embodiment of the present disclosed example.

Please refer to FIG. 12. FIG. 12 is the flowchart of automatically retrying according to the fourth embodiment of the present disclosed example. After the self-propelled apparatus 10 moves to the charging position, the self-propelled apparatus 10 may be unable to charge up correctly caused by some reasons (such as the electrical device 104 does not be connected to the electrical unit 203 in a correct way, or poor contact). This status causes a failure of charging up. To solve the above problem, the present disclosed example provides a function of re-coupling implemented by the following steps S40-S42.

Step S40: the controller 100 determines using the control module for re-docking 1007 whether the self-propelled apparatus 10 has arrived at the charging position and the charging dock 20 does not start charging the self-propelled apparatus 20.

In one of the exemplary embodiments, the controller 100 determines using the front sensor 102 or the flank sensor 103 whether the distance between the self-propelled apparatus 10 and the light emitter 202 of the charging dock 20 is less than the charging distance and the charging dock 20 does not start to charge the self-propelled apparatus 10.

If the self-propelled apparatus 10 has arrived at the charging position and the charging dock 20 has started to charge the self-propelled apparatus 10, this detection is finished.

If the self-propelled apparatus 10 has arrived at the charging position and the charging dock 20 does not start to charge the self-propelled apparatus 10, step S41 is executed: the controller 100 enables the control module for re-docking 1007 to control the driving device 105 to make the self-propelled apparatus 10 move away from the charging dock 20.

In one of the exemplary embodiments, the self-propelled apparatus 10 turns and moves backward for keeping away from the charging dock 20 along the spiral trajectory. Because the sensing directions of the front sensor 102 and the flank sensor 103 will be changed continuously during rotation of the self-propelled apparatus 10, the self-propelled apparatus 10 can detect the obstacles nearby by rotation, so as to prevent collision with the obstacle. Furthermore, the self-propelled apparatus 10 moves backward to leave from the charging dock 20.

Step S42: the controller 100 and the control unit 200 execute the automatic guiding procedure for making the self-propelled apparatus 10 approach the charging dock 20 again, arrive at the charging position and be charged.

Thus, the present disclosed example can effectively exclude the problem of failed charging.

Figure 18:
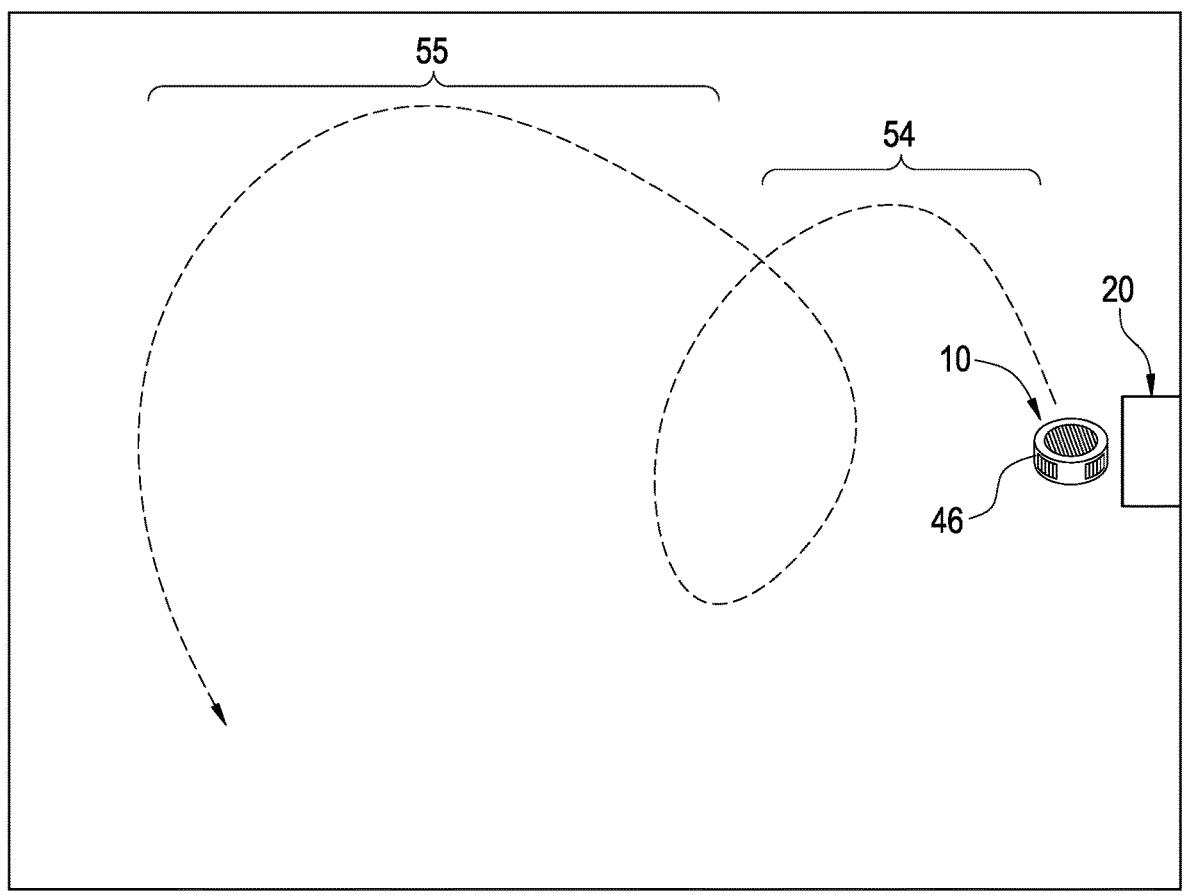
FIG. 18 is the schematic view of retrying guiding according to the sixth example of the present disclosed example.

Please refer to FIG. 18. FIG. 18 is the schematic view of retrying guidance according to the sixth example of the present disclosed example. FIG. 18 is used to explain how to leave from the charging dock gradually.

In this example, the self-propelled apparatus 10 first turns and moves along a first spiral trajectory 54 to slightly move away from the charging dock 20. Then, the self-propelled apparatus 10 turns and moves along a second spiral trajectory 55 with a radius greater than a radius of the first spiral trajectory 54 to move away from the charging dock 20.

Thus, the present disclosed example can effectively prevent the collision of the obstacle with a few sensors arranged on the self-propelled apparatus 10.

The above-mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. An automatic guiding method used to guide a self-propelled apparatus to move to a charging position of a charging dock, the method comprising following steps:
    a) controlling the self-propelled apparatus to turn in a first turn direction and move within an irradiation range of a light-emitting unit of the charging dock when sensing a signal light embedding a first signal emitted by the light-emitting unit installed at a position corresponding to the charging position of the charging dock by a flank sensor installed on left-half flank or right-half flank of the self-propelled apparatus and controlling a light emitter of the self-propelled apparatus installed on a front side of the self-propelled apparatus to irradiate during turning and moving;
    b) controlling the light-emitting unit to switch to emit a signal light embedding a second signal when the light-emitting unit of the charging dock emits the signal light embedding the first signal and a sensing unit installed beside the light-emitting unit of the charging dock is triggered by irradiation of the light emitter of the self-propelled apparatus;
    c) controlling the self-propelled apparatus to turn in a second turn direction opposite to the first turn direction when a front sensor installed on the front side of the self-propelled apparatus senses the signal light embedding the second signal, and controlling the light emitter to irradiate during turning;
    d) controlling the light-emitting unit to switch to emit the signal light embedding the first signal when the light-emitting unit of the charging dock emits the signal light embedding the second signal and the sensing unit is triggered by irradiation of the light emitter of the self-propelled apparatus;
    e) controlling the self-propelled apparatus to turn in the first turn direction when the front sensor of the self-propelled apparatus senses the signal light embedding the first signal, and controlling the light emitter to irradiate during turning; and
    f) repeatedly executing the steps b) to e) and simultaneously controlling the self-propelled apparatus to approach the light-emitting unit until the self-propelled apparatus reaches the charging position and starts charging by the charging dock.

2. The automatic guiding method according to claim 1, further comprising following step executed before the step a):
    g) sensing a position of any wall by the front sensor or the flank sensor when a condition of return is met, and controlling the self-propelled apparatus to move along the wall.

3. The automatic guiding method according to claim 2, wherein the step g) comprises following steps:
    g1) controlling the self-propelled apparatus to move randomly and sense the wall by the front sensor or the flank sensor during movement when the condition of return is met; and
    g2) controlling the self-propelled apparatus to move along the wall when sensing the wall by the front sensor or the flank sensor.

4. The automatic guiding method according to claim 3, wherein the step g2) is to control the self-propelled apparatus to make the flank sensor to sense toward the wall during movement.

5. The automatic guiding method according to claim 3, wherein the step g) further comprises following step:

g3) controlling the self-propelled apparatus to move away from the wall and search for another wall when a condition of stopping moving along walls is met and the self-propelled apparatus does not sense the signal light embedding the first signal during moving along the wall.

6. The automatic guiding method according to claim 1, further comprising a step f) controlling the self-propelled apparatus to execute a coupling movement for making an electricity connection device of the self-propelled apparatus couple to an electricity connection unit of the charging dock after the self-propelled apparatus arrives the charging position.

7. The automatic guiding method according to claim 1, wherein the flank sensor of the self-propelled apparatus is to sense toward rear right flank or rightmost flank of the self-propelled apparatus, the light emitter is to irradiate toward front left-half flank of the self-propelled apparatus and does not irradiate toward front right-half flank; the first turn direction is a direction of counterclockwise; the second turn direction is a direction of clockwise.

8. The automatic guiding method according to claim 1, wherein the flank sensor of the self-propelled apparatus is to sense toward rear left flank or leftmost flank of the self-propelled apparatus, the light emitter is to irradiate toward front right-half flank of the self-propelled apparatus and does not irradiate toward front left-half flank; the first turn direction is a direction of clockwise; the second turn direction is a direction of counterclockwise.

9. The automatic guiding method according to claim 1, wherein the step a) is executed to controlling the self-propelled apparatus to firstly advance a default distance for entering to the irradiation range of the light-emitting unit of the charging dock, and then turn in the first turn direction.

10. The automatic guiding method according to claim 1, wherein the step b) is executed to start to determine whether the sensing unit is out of irradiation of the light emitter when the sensing unit is irradiated by the light emitter of the self-propelled apparatus, and determine that the sensing unit is triggered by the light emitter when the sensing unit is out of irradiation of the light emitter;
    the step d) is executed to start to determine whether the sensing unit is out of irradiation of the light emitter when the sensing unit is irradiated by the light emitter of the self-propelled apparatus, and determine that the sensing unit is triggered by the light emitter when the sensing unit is out of irradiation of the light emitter.

11. The automatic guiding method according to claim 1, wherein the step f) is executed to determine that the self-propelled apparatus arrives the charging position when determining that a distance between the front sensor and the light emitter of the charging dock is not greater than a charging distance, and controlling the self-propelled apparatus to turn for making the light emitter align with the sensing unit of the charging dock.

12. The automatic guiding method according to claim 1, further comprising following steps:
    i1) controlling the self-propelled apparatus to turn and move for moving away from the charging dock along a spiral trajectory when determining that a distance between the front sensor and the light emitter of the charging dock is not greater than a charging distance and the self-propelled apparatus fails to be charged up by the charging dock; and
    i2) executing the steps a) to e) again for guiding the self-propelled apparatus to move to the charging position.

13. The automatic guiding method according to claim 12, wherein the step i1) is executed to controlling the self-propelled apparatus to firstly turn and move along a first spiral trajectory, and then turn and move along a second spiral trajectory having a radius greater than a radius of the first spiral trajectory for moving away from the charging dock gradually.

14. The automatic guiding method according to claim 1, further comprising following steps:
- j1) controlling the self-propelled apparatus to turn in the second turn direction and move within the irradiation range of the light-emitting unit of the charging dock when another flank sensor installed on another flank of the self-propelled apparatus senses the signal light embedding the first signal emitted by the light-emitting unit of the charging dock, and controlling another light emitter installed on the front flank of the self-propelled apparatus to irradiate during turning and moving;
- j2) controlling the light-emitting unit to switch to emit the signal light embedding the second signal when the light-emitting unit of the charging dock emits the signal light embedding the first signal and the sensing unit is triggered by the another light emitter of the self-propelled apparatus;
- j3) controlling the self-propelled apparatus to turn in the first turn direction when the front sensor of the self-propelled apparatus senses the signal light embedding the second signal, and controlling the another light emitter to irradiate during turning;
- j4) controlling the light-emitting unit to switch to emit the signal light embedding the first signal when the light-emitting unit of the charging dock emits the signal light embedding the second signal and the sensing unit is triggered by the another light emitter of the self-propelled apparatus;
- j5) controlling the self-propelled apparatus to turn in the second turn direction when the front sensor of the self-propelled apparatus senses the signal light embedding the first signal, and controlling the another light emitter to irradiate during turning; and
- j6) repeatedly executing the steps j2) to j5) and simultaneously controlling the self-propelled apparatus to approach the light-emitting unit until the self-propelled apparatus reaches the charging position and starts charging by the charging dock.

15. The automatic guiding method according to claim 14, wherein the light emitter is to irradiate toward a half flank which the another flank sensor is located and does not irradiate toward a half flank which the flank sensor is located; the another light emitter is to irradiate toward the half flank which the flank sensor is located and does not irradiate toward the half flank which the another flank sensor is located.

* * * * *